US010062018B2

(12) United States Patent
Inoue et al.

(10) Patent No.: US 10,062,018 B2
(45) Date of Patent: Aug. 28, 2018

(54) PRINT CONTROL SYSTEM, PRINT CONTROL APPARATUS, PRINT CONTROL METHOD, AND STORAGE MEDIUM THAT DETERMINE WHETHER PRINTING CAN BE PERFORMED BASED ON PAPER INFORMATION

(71) Applicant: CANON KABUSHIKI KAISHA, Tokyo (JP)

(72) Inventors: Yuki Inoue, Yokohama (JP); Kazuhisa Ebuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 14/747,957

(22) Filed: Jun. 23, 2015

(65) Prior Publication Data

US 2016/0004939 A1 Jan. 7, 2016

(30) Foreign Application Priority Data

Jul. 3, 2014 (JP) .................................. 2014-138021
May 22, 2015 (JP) .................................. 2015-104914

(51) Int. Cl.
*G06K 15/02* (2006.01)
*G06K 15/16* (2006.01)
*G06K 15/00* (2006.01)

(52) U.S. Cl.
CPC ..... *G06K 15/1809* (2013.01); *G06K 15/1823* (2013.01); *G06K 15/4065* (2013.01)

(58) Field of Classification Search
CPC ... G06K 15/1809; G06K 15/16; G06K 15/021
USPC ....................................................... 358/1.14
See application file for complete search history.

(56) References Cited

U.S. PATENT DOCUMENTS

| 8,072,622 | B2 * | 12/2011 | Yasue | B41J 29/393 |
| | | | | 347/12 |
| 8,804,218 | B2 | 8/2014 | Ebuchi et al. | |
| 2005/0030334 | A1 * | 2/2005 | Kai | B41J 11/009 |
| | | | | 347/19 |
| 2007/0296748 | A1 * | 12/2007 | Oki | B41J 11/485 |
| | | | | 347/14 |
| 2012/0050803 | A1 | 3/2012 | Ebuchi et al. | |

FOREIGN PATENT DOCUMENTS

JP  2006-18463 A  1/2006

* cited by examiner

*Primary Examiner* — Neil R McLean
*Assistant Examiner* — Darryl V Dottin
(74) *Attorney, Agent, or Firm* — Fitzpatrick, Cella, Harper & Scinto

(57) ABSTRACT

A print control system that controls a printing apparatus having a paper feed unit, the system includes one or more processors operating, to determine whether printing using print data can be performed, based on first paper information included in a print setting in the print data, second paper information that is set in the printing apparatus, and printability information indicating a printable combination of the first paper information included in the print setting and the second paper information set in the printing apparatus. The first paper information included in the print setting and the second paper information set in the printing apparatus each includes both of (i) information regarding a type of paper and (ii) information regarding a size of paper. The printing is controlled using the print data, based on a result of the determination.

19 Claims, 23 Drawing Sheets

F I G. 4

| PAPER FEED PORT | MEDIA | SIZE |
|---|---|---|
| AUTO SHEET FEEDER | POSTCARD | POSTCARD |
| CASSETTE 1 | PLAIN PAPER | A4 |
| CASSETTE 2 | GLOSSY PAPER | L |
| . . . | . . . | . . . |

F I G. 5

| MEDIA | SIZE | CONTENT OF CHANGE |
|---|---|---|
| PLAIN PAPER | POSTCARD | MEDIA HAS BEEN CHANGED FROM PLAIN PAPER TO POSTCARD |
| POSTCARD | OTHER THAN POSTCARD | SIZE HAS BEEN CHANGED TO POSTCARD |
| . . . | . . . | . . . |

FIG. 6

●MEDIA

| PRINT SETTING INFORMATION | PAPER INFORMATION | SUPPLEMENTARY CONDITION |
|---|---|---|
| PLAIN PAPER | PLAIN PAPER | – |
| POSTCARD | POSTCARD | – |
| POSTCARD | PLAIN PAPER | ONLY WHEN SIZE IN PRINT SETTING INFORMATION AND PAPER INFORMATION IS POSTCARD |
| ⋮ | ⋮ | ⋮ |

●SIZE

| PRINT SETTING INFORMATION | PAPER INFORMATION | SUPPLEMENTARY CONDITION |
|---|---|---|
| A4 | A4 | – |
| LETTER | LETTER | – |
| POSTCARD | POSTCARD | – |
| POSTCARD | OTHER THAN POSTCARD | ONLY WHEN MEDIA IN PRINT SETTING INFORMATION AND PAPER INFORMATION IS POSTCARD |
| ⋮ | ⋮ | ⋮ |

FIG. 8

```
PAPER BEING DIFFERENT FROM PAPER
IN PRINT SETTINGS IS SET

PAPER INFORMATION IN PAPER SETTINGS     ~800
MEDIA: GLOSSY PAPER
SIZE: L
```

F I G. 12
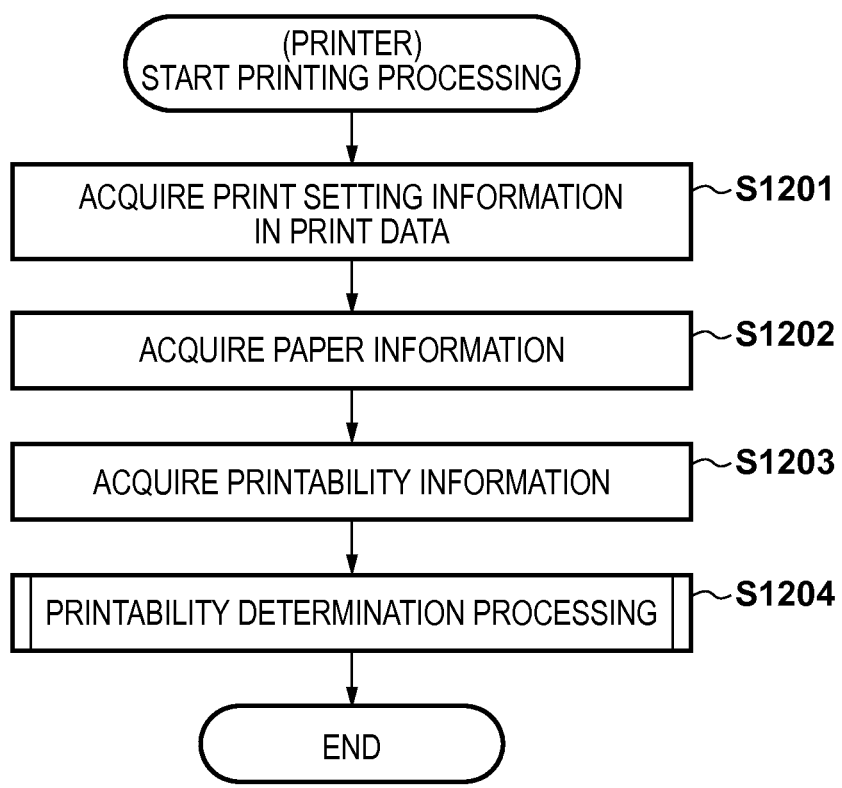

FIG. 18

●MEDIA

| PRINT SETTING INFORMATION | PAPER INFORMATION | SUPPLEMENTARY CONDITION |
|---|---|---|
| PLAIN PAPER | PLAIN PAPER | – |
| POSTCARD | POSTCARD | – |
| POSTCARD | PLAIN PAPER | ONLY WHEN SIZE IN PRINT SETTING INFORMATION AND PAPER INFORMATION IS POSTCARD, AND WHEN PRINT SETTING CHANGE INFORMATION EXISTS |
| . . . | . . . | . . . |

●SIZE

| PRINT SETTING INFORMATION | PAPER INFORMATION | SUPPLEMENTARY CONDITION |
|---|---|---|
| A4 | A4 | – |
| LETTER | LETTER | – |
| POSTCARD | POSTCARD | – |
| POSTCARD | OTHER THAN POSTCARD | ONLY WHEN MEDIA IN PRINT SETTING INFORMATION AND PAPER INFORMATION IS POSTCARD, AND WHEN PRINT SETTING CHANGE INFORMATION EXISTS |
| . . . | . . . | . . . |

F I G. 22

●MEDIA

| PRINT SETTING INFORMATION | PAPER FEED UNIT PAPER INFORMATION | SUPPLEMENTARY CONDITION |
|---|---|---|
| PHOTO POSTCARD (DOCUMENT SIDE) | PHOTO POSTCARD | - |
| PHOTO POSTCARD (ADDRESS SIDE) | PHOTO POSTCARD | - |
| .. .. | .. .. | .. .. |

PRINT CONTROL SYSTEM, PRINT CONTROL APPARATUS, PRINT CONTROL METHOD, AND STORAGE MEDIUM THAT DETERMINE WHETHER PRINTING CAN BE PERFORMED BASED ON PAPER INFORMATION

BACKGROUND OF THE INVENTION

Field of the Invention

The present invention relates to a technique of controlling printing using print data that is output to a printing apparatus having a paper feed unit.

Description of the Related Art

Various types and sizes of media such as paper are used to form (print) an image with a printer. When supplying print data to a printer from a data processing apparatus (e.g., a PC (personal computer)) connected to the printer to perform printing, a user sets the type and size of media using a setting screen of a printer driver installed in the data processing apparatus. On the other hand, since the user can also set various setting items other than the type and size of the media using the printer driver, a case is conceivable where the user gives a print instruction while being unable to correctly set an actually available setting item in the printer.

To avoid this, a method is available by which if the printer driver determines that a combination of setting items is incorrect, the printer driver generates print data after changing the setting items and transmits the print data to the printer. Meanwhile, printable media and sizes are restricted at a paper feed unit of the printer in some cases. For example, Japanese Patent Laid-Open No. 2006-18463 describes a technique by which, if it is determined that a paper size designated in print data is not supported by the paper feed unit, a warning screen indicating this determination is displayed on the data processing apparatus connected to the printer.

A situation where printing is not appropriately performed is conceivable when using the technique of generating print data after changing setting items when the printer driver determines that a combination of setting items is incorrect, and the technique in Japanese Patent Laid-Open No. 2006-18463. For example, the user sets "plain paper" as the media type and "postcard" as the size. Meanwhile, it is assumed that the paper feed unit of the printer supports "plain paper" as the media type and "postcard" as the size. Here, assume that the printer driver determines that a combination of "media: plain paper" and "size: postcard" is incorrect, and generates print data after changing the media type from "plain paper" to "postcard". On the other hand, since "plain paper" and "postcard" are printable at the paper feed unit, it is determined that the combination of the media type after being changed and the size is not supported, then a warning screen is displayed, and there is a possibility that printing is not appropriately performed.

SUMMARY OF THE INVENTION

The present invention has been made for solving the above-described problem, and provides a technique for appropriately performing printing.

According to a first aspect, the present invention provides a print control system that controls a printing apparatus having a paper feed unit, the system comprising, a determination unit that determines whether or not printing using print data can be performed, based on print setting information in the print data, paper information regarding paper that is set in the paper feed unit of the printing apparatus, and printability information indicating a printable combination of the print setting information and the paper information, and a control unit that controls the printing using the print data, based on a result of the determination of the determination unit.

According to a second aspect, the present invention provides a print control apparatus that outputs print data to a printing apparatus having a paper feed unit, the print control apparatus comprising, a setting unit that sets first print setting information with respect to the print data that is output to the printing apparatus, a changing unit that changes the first print setting information into second print setting information based on a predetermined condition, a transmission unit that transmits the print data to the printing apparatus; and a control unit that controls printing using the print data, based on print setting information for print data to be transmitted to the printing apparatus, paper information regarding paper which is set in the paper feed unit of the printing apparatus, and printability information indicating a printable combination of the print setting information and the paper information, and based on a result of determination of whether or not the print data is printable.

According to a third aspect, the present invention provides a print control apparatus that controls a printing apparatus having a paper feed unit, the apparatus comprising, a reception unit that receives print data, a determination unit that determines whether or not the print data is printable, based on print setting information for the print data, paper information regarding paper that is set in the paper feed unit of the printing apparatus, and printability information indicating a printable combination of the print setting information and the paper information, and a control unit that controls printing using the print data, based on a result of the determination of the determination unit.

According to a fourth aspect, the present invention provides a print control method for controlling a printing apparatus having a paper feed unit, the method comprising, a determination step of determining whether or not printing using print data can be performed, based on print setting information in the print data, paper information regarding paper that is set in the paper feed unit of the printing apparatus, and printability information indicating a printable combination of the print setting information and the paper information, and a control step of controlling the printing using the print data, based on a result of the determination in the determination step.

Further features of the present invention will become apparent from the following description of exemplary embodiments with reference to the attached drawings.

BRIEF DESCRIPTION OF THE DRAWINGS

FIG. 4 is a diagram showing exemplary paper information.

FIG. 5 is a diagram showing exemplary print setting change conditions.

FIG. 6 is a diagram showing exemplary printability information.

FIG. 8 is a diagram showing an exemplary display of a warning screen.

FIG. 12 is a flowchart showing printing processing in Embodiment 1.

FIG. 18 is a diagram showing exemplary printability information in which print setting change information is added to a supplementary condition.

FIG. 22 is a diagram showing exemplary printability information in Embodiment 5.

DESCRIPTION OF THE EMBODIMENTS

Embodiments will be hereinafter described in detail with reference to the attached drawings. Note that the following embodiments are not intended to limit the present invention according to the claims, and not all combinations of features described in the embodiments are necessarily essential to the solving means of the present invention.

Embodiment 1

Figure 1:
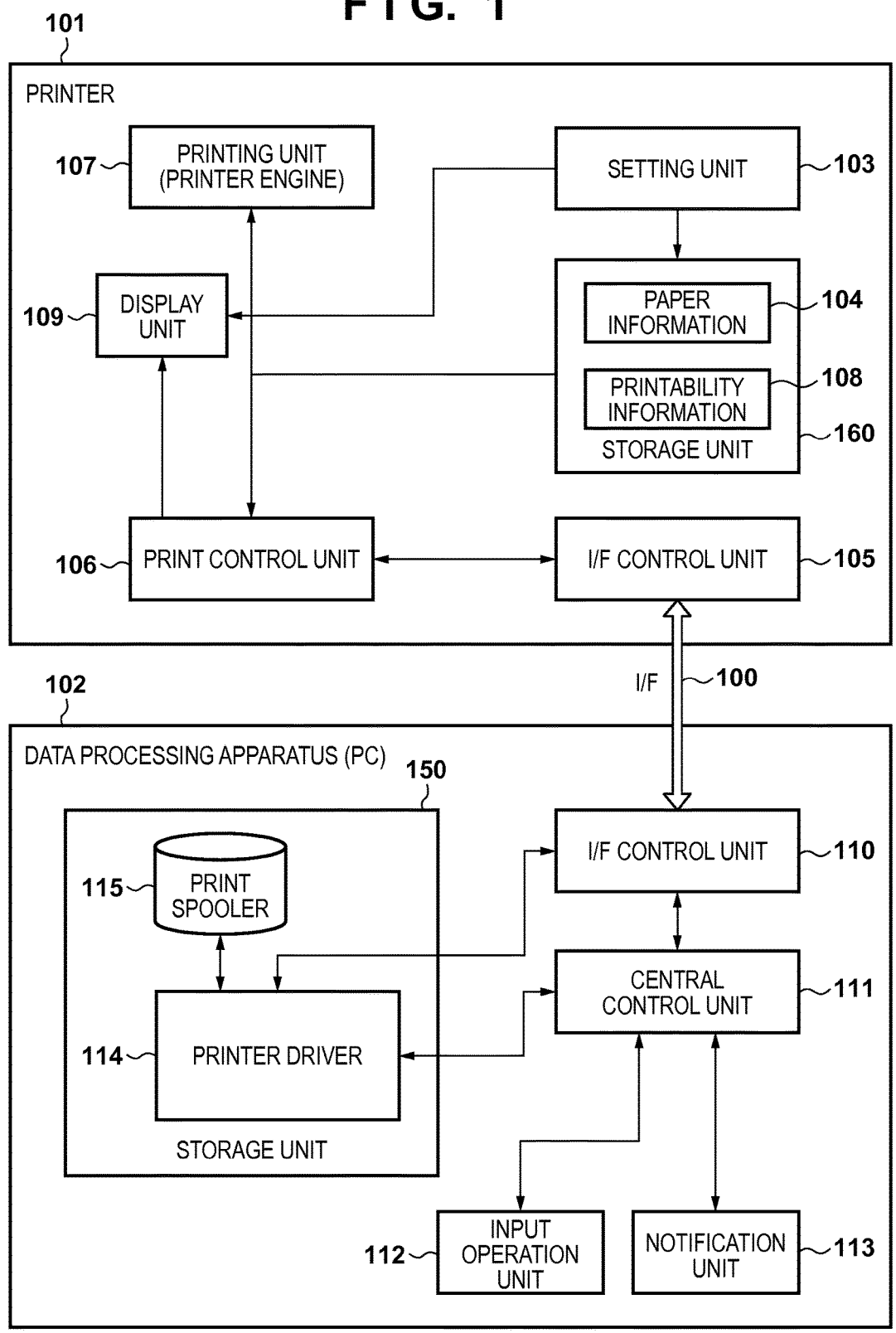
FIG. 1 is a block diagram showing a system configuration.

FIG. 1 is a block diagram showing a configuration of a printing system including a printer, which is a printing apparatus, and a data processing apparatus, which is an information processing apparatus.

In FIG. 1, 101 denotes an inkjet color printer (printer) for performing image formation, which forms an image based on print data generated by a data processing apparatus (e.g., a personal computer (PC)) 102. The printer 101 includes a plurality of paper feed units.

Although the type of the printer is not particularly limited in the present embodiment, it should be noted that an inkjet color printer is assumed here.

In FIG. 1, the PC 102 generates print data, transmits the print data to the printer 101 that is connected to the PC 102 via a communication interface (I/F) 100, and control this data transmission. The PC 102 also plays a role of accepting an instruction and input relating to print settings from a user. In the PC 102, an operating system (not shown) that controls the PC 102 is installed in a storage unit 150, and various constituent elements constituting the PC 102 operate on this operating system.

USB, which is a serial interface, is assumed as the communication interface 100, for example. However, other wired communication interfaces of IEEE1394, the Ethernet, IrDA, IEEE802.11, a power line, and the like are also available. Also, parallel interfaces of Centronics, SCSI, and the like can be used in place of the serial interface. The communication interface 100 is not limited thereto, and may be any kind of communication interface regardless of a wired or wireless interface, as long as the communication interface 100 achieves bidirectional communication.

Thus, the printing system in the present embodiment is not a single apparatus, but employs a configuration in which the PC 102 and the printer 101 that performs image formation are connected to each other by a specific bidirectional interface. However, the printing system is not limited thereto. For example, the printing system may be an apparatus integral-type printing system in which functions of the PC 102 and the printer 101 are integrated. Note that a description of functions of the printer 101 and the PC 102 that are not particularly necessary for describing features of the present embodiment will be omitted.

In the printer 101, 109 denotes a display unit, which is achieved by a display device such as an LED for displaying paper information of the paper feed units and print information (e.g., warning information) controlled by a print control unit 106. 103 denotes a setting unit, which sets the paper information of the plurality of paper feed units provided as a part of a printing unit (printer engine) 107. In addition, the setting unit 103 can configure various settings relating to the printer 101. The setting unit 103 includes user interfaces such as a touch panel and buttons, for example, for setting the paper information of the paper feed units. Alternatively, a sensor that reads the paper information of paper set in each paper feed unit may be provided separately from the setting unit 103 or as the setting unit 103. In this case, the paper information detected using this sensor can be set as the paper information of each paper feed unit. Note that the paper information of the paper feed units is information regarding the paper feed units, such as a type, size, and the like of paper, which is media loaded in the paper feed units.

160 denotes a storage unit, which includes a nonvolatile storage device such as a flash memory, for example. This storage unit 160 stores paper information 104 indicating information regarding paper in the paper feed units that is set by the setting unit 103, and printability information 108 indicating printable combinations of print setting information in the print data received from the PC 102 and the paper information 104. The storage unit 160 also includes a RAM, which serves as a work area for processing and an area for temporarily storing data in the printer 101, in addition to the nonvolatile storage device. The storage unit 160 further includes a ROM that stores a software program for driving the printer 101, and a boot program for controlling the software program.

106 denotes a print control unit, which receives the print data from the PC 102 and deploys the print data such that the printer engine 107 can process the print data. The print data received from the PC 102 is data on which image processing has been performed on the PC 102 side based on the print setting information including a type and size of the media, and the like. Here, the printer engine 107 is controlled in accordance with a print control command included in the print data. Specifically, data constituted by binary data for printing (under some circumstances, intermediate data before being binarized) and various commands for controlling the amount of injected ink, the number of paths, a printing direction, and a paper conveyance amount is used. The print control unit 106 uses the print setting information in the print data received from the PC 102, the paper information 104, and the printability information 108 to determine whether or not printing can be performed using this print data. If it is determined that printing cannot be performed, a warning screen indicating that printing cannot be performed is displayed using the display unit 109.

107 denotes a printing unit (printer engine), and performs printing on recording media (paper) based on the print data deployed by the print control unit 106. Since the printer 101 is an inkjet printer, the printer 101 forms an image on the recording media by discharging ink. 105 denotes an I/F control unit that governs an interface function of the printer 101.

In the PC 102, 114 denotes a printer driver, which is software for performing various settings for printing, generation of the print data, and control of the printer 101 on the PC 102. The details of the printer driver 114 will be described later using FIG. 2. 115 denotes a print spooler, which sequentially stores the print data generated by a print data generation unit 116 and transfers the stored print data to the printer 101. Since the storage and transfer of the print data are asynchronously performed, even if print data generation processing is performed faster than printing processing of the printer 101, the print data generation processing does not need to wait for the printing processing of the printer 101, and is efficiently performed. In general, the print spooler 115 is provided as a function of the operating system of the PC 102.

This printer driver 114 and the print spooler 115 are stored in the storage unit 150 that includes a nonvolatile storage device such as a hard disk. This storage unit 150 also includes a RAM, which serves as a work area for processing and an area for temporarily storing data in the PC 102. The storage unit 150 further includes a ROM that stores a program for driving the PC 102 and a boot program for controlling the program.

111 denotes a central control unit that controls various functions of the PC 102, and is a so-called CPU. 112 denotes an input operation unit, which is constituted by various input devices for reflecting intention of the user in print settings. This input operation unit 112 is achieved by a pointing device such as a keyboard or a mouse, a touch panel, and the like, for example. 113 denotes a notification unit, which notifies the user of various kinds of information such as print settings and a warning. Possible notification methods include use of a display device such as a monitor and use of an audio output device such as a speaker.

110 denotes an I/F control unit that governs an interface function of the PC 102. The I/F control unit 110 is constituted by a controller on a USB host side, and functions as a USB host. A part of the USB host function is also constituted by software such as the OS and a driver.

Figure 2:
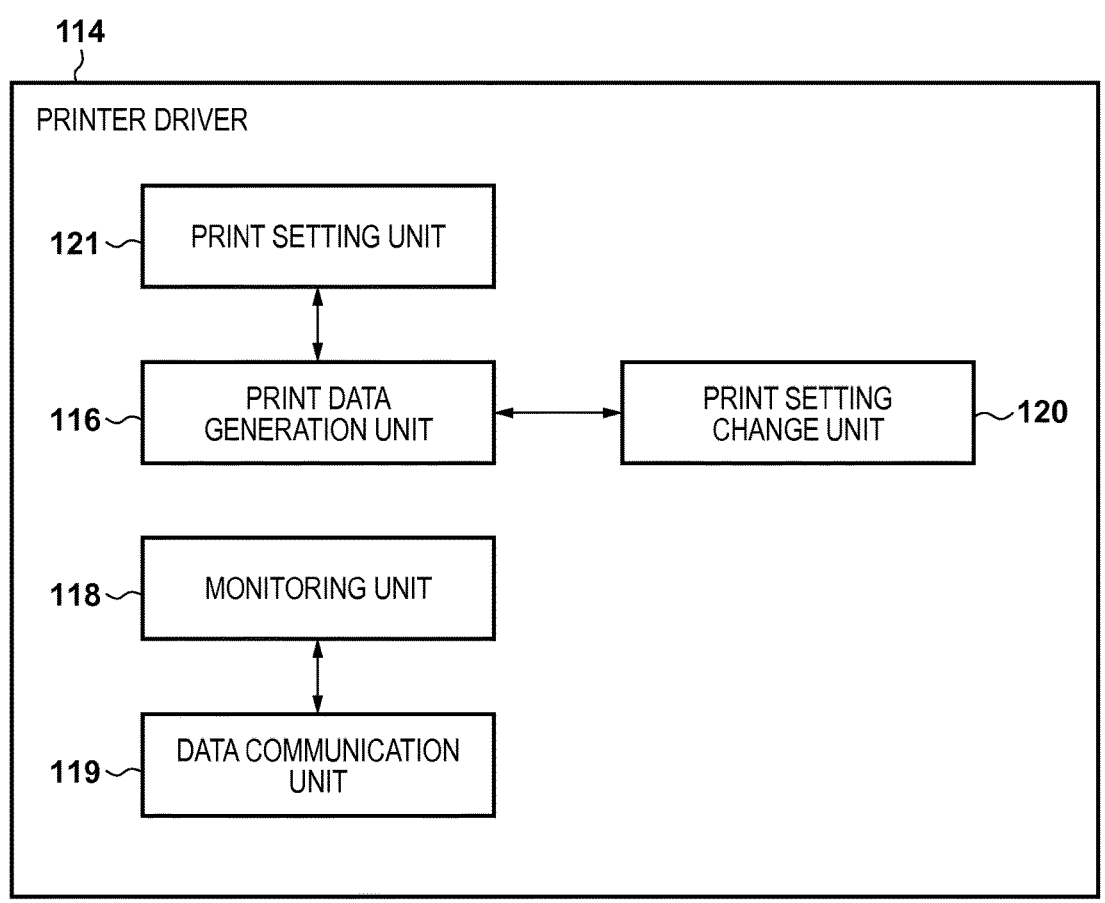
FIG. 2 is a block diagram showing an internal configuration of a printer driver.

FIG. 2 is a block diagram showing an internal configuration of the printer driver 114.

In FIG. 2, 121 denotes a print setting unit, which performs various print settings including a setting of media that is paper, a setting of the size thereof, a setting of print quality, and the like. The print setting unit 121 has a function of accepting an instruction and input from the user via the input operation unit 112, and displaying or notifying the user of the content (e.g., print settings) of the instruction and the input. 116 denotes a print data generation unit, which generates the print data based on the print setting information set by the print setting unit 121 and data of a print target, and spools the print data to the print spooler 115.

118 denotes a monitoring unit, which sequentially transfers the print data stored in the print spooler 115 to the printer 101 via the I/F control unit 110 from the data communication unit 119, in accordance with an instruction of the print spooler 115. The monitoring unit 118 analyzes the content of the print data before transferring the print data to the printer 101 and acquires the print setting information. The monitoring unit 118 also acquires status information such as sensor information of a paper sensor installed in the printer 101 through bidirectional communication with the printer 101, and controls the transfer of the print data to the printer 101 based on the acquired status information.

119 denotes the data communication unit, and performs communication processing with the printer 101 via the I/F control unit 110 in accordance with an instruction of the monitoring unit 118. Processing for communicating with the printer 101 is bidirectional. This communication processing includes processing for transferring data such as the print data to the printer 101, and processing for acquiring, from the printer 101, the status information of the printer 101 such as the paper sensor information, the progress of the printing processing, and remaining ink amount information. 120 denotes a print setting change unit, which changes the print setting information set by the print setting unit 121 in accordance with a predetermined print setting change condition.

When the PC 102 performs a warning display, information of this warning is displayed by the notification unit 113. For example, if an error occurs in the printer 101 and information of this error is displayed, the data communication unit 119 acquires the error information of the printer 101, and the monitoring unit 118 causes the notification unit 113 of the PC 102 to display the warning information. Also, when displaying warning information indicating that printing cannot be performed for the reason of inadequacy of the print settings or the like when generating the print data, the print data generation unit 116 causes the notification unit 113 of the PC 102 to display the warning information.

Figure 3:
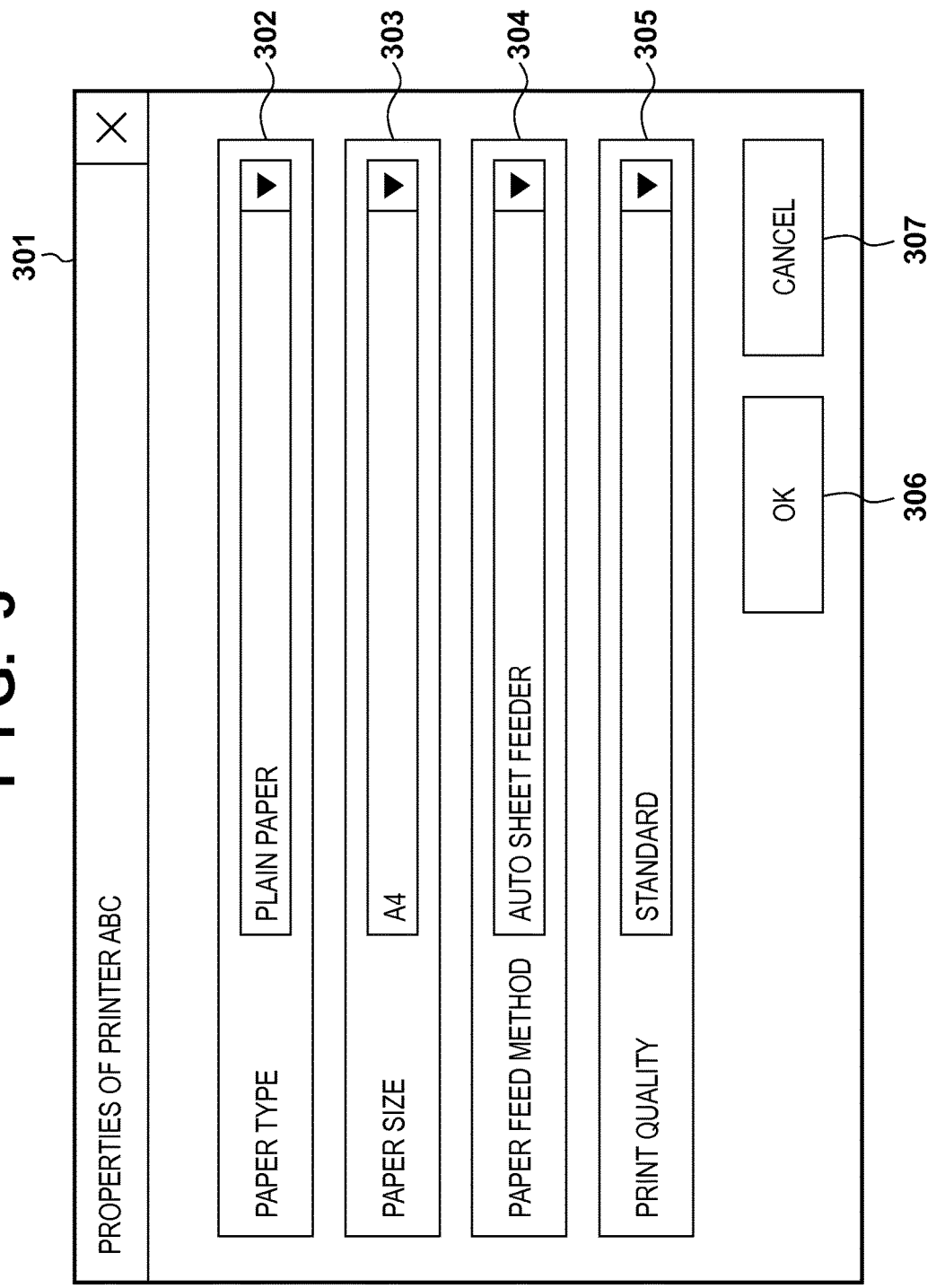
FIG. 3 is a diagram showing an example of a print setting screen.

FIG. 3 is a diagram showing an exemplary print setting screen displayed on the notification unit 113 of the PC 102. This print setting screen is displayed when configuring the print settings in the present embodiment, and is achieved by a print setting dialog box, for example.

In FIG. 3, a print setting screen 301 is displayed before the user gives a print instruction through an application program or the like. For example, the printer driver 114 is selected in a print dialog of the application program, and the print setting screen 301 is displayed by the user pressing a property button. On the print setting screen 301, print settings relating to print data generation, such as a type of paper that is media, a paper size, a paper feed method, and print quality, can be accepted. Note that the print setting screen 301 is displayed on the display device provided in the notification unit 113 in FIG. 1.

In the print setting screen 301 in FIG. 3, 302 denotes a paper type display/operation control, which is a pull-down menu control for displaying and operating a set paper type. A paper type can be set with the paper type display/operation control 302, and for example, paper type options such as "plain paper", "glossy paper", "postcard", and "envelop" are prepared.

303 denotes a paper size display/operation control, which is a pull-down menu control for displaying and operating a set paper size. In the paper size display/operation control 303, for example, paper size options such as "B5", "A4", "Letter", "postcard", "business card", "L", and "2L" are prepared. Then, the print data is generated based on the width and length of the paper corresponding to the paper size selected with the paper size display/operation control 303. Note that when performing printing from some application programs, the print data is generated based not on the paper size set with the paper size display/operation control 303 but on the paper size (paper width and length) set with the application programs in some cases.

304 denotes a paper feed method display/operation control, which is a pull-down menu control for displaying and operating a type (paper feed method) of the paper feed unit of the printer 101 to be used at the time of printing. In the paper feed method display/operation control 304, paper feed method options such as "auto sheet feeder", "cassette 1", "cassette 2", and "auto paper feed", are prepared, for example.

Note that "auto sheet feeder", "cassette 1", and "cassette 2" among the paper feed method options correspond respectively to "auto sheet feeder", "cassette 1", and "cassette 2", which are physical paper feed units provided in the printer 101, one-by-one. When a print instruction is issued in which one of these options is selected, the printer 101 feeds paper from the selected paper feed unit and executes printing. On the other hand, "auto paper feed" does not refer to a physical paper feed unit of the printer 101. If a print instruction is issued in which the auto paper feed is selected, the printer driver 114 generates the print data while setting a value indicating "auto paper feed" in a paper feed setting command. The printer 101 that receives this print data automatically determines an appropriate paper feed unit from among the physical paper feed units using the print setting information in the print data transmitted from the PC 102, the paper information 104, and the printability information 108. The printer 101 then feeds paper from the determined paper feed unit and performs printing.

305 denotes a print quality display/operation control, which is a pull-down menu control for displaying and operating print quality. The setting of the print quality display/operation control 305 is different for respective paper types. In the print quality display/operation control 305, print quality options such as "fine", "standard", and "quick" are prepared, for example.

306 denotes an OK button, and upon this OK button 306 being pressed, the content of the setting items selected in the print setting screen 301 is saved as the print setting information in the storage unit 160, and the display of the print setting screen 301 ends. 307 denotes a cancel button, and upon this cancel button 307 being pressed, the content of the setting items selected in the print setting screen 301 are restored to a state before being changed, and thereafter the display of the print setting screen 301 ends. Note that the print setting screen 301 may further have an update button for updating the content of the setting items and saving the updated content in the storage unit 160. Thus, the print setting screen 301 has a screen configuration in which the setting items necessary for the user are gathered, and with this configuration, the user can instantly check the print settings that are currently configured.

FIG. 4 shows exemplary information regarding paper in the respective paper feed units stored in the paper information 104. In FIG. 4, "auto sheet feeder", "cassette 1", and "cassette 2" are included as the paper feed units. A state is indicated where "postcard" is set as the media (media type) and "postcard" is set as the size for the auto sheet feeder, "plain paper" is set as the media and "A4" is set as the size for the cassette 1, and "glossy paper" is set as the media and "L" is set as the size for the cassette 2. The paper information of each paper feed unit may be set by the user using the setting unit 103, or a sensor that detects the type and size of the media set in each paper feed unit may be installed, and the paper information of each paper feed unit may be automatically set using the sensor.

FIG. 5 shows exemplary conditions (print setting change conditions) for changing the content of the print setting information set by the print setting unit 121. The example shown in FIG. 5 indicates that "the media is changed from plain paper to postcard" if "plain paper" is set as the media and "postcard" is set as the size in the print setting information. It is also indicated that "the size is changed to postcard" if "postcard" is set as the media and a size "other than postcard" is set as the size in the print setting information. The print setting change unit 120 stores such condition information (print setting change conditions), and the print setting change unit 120 changes the print setting information based on the condition information. Note that these print setting change conditions may be stored in the printer driver from the beginning, or may be set by the user.

FIG. 6 shows exemplary printability information 108. The printability information 108 shown here indicates printable combinations (i.e., combinations regarding which printing is permitted) of "media" or of "sizes" that are set in the print setting information and the paper information 104.

First, regarding the media, printing can be performed under the following conditions.

In the case of a combination of the print setting information indicating "plain paper" and the paper information indicating "plain paper"

In the case of a combination of the print setting information indicating "postcard" and the paper information indicating "postcard"

In the case of a combination of the print setting information indicating "postcard" and the paper information indicating "plain paper", with a supplementary condition that the size in the print setting information and the paper information is "postcard"

Regarding the size, printing can be performed under the following conditions.

In the case of a combination of the print setting information indicating "A4" and the paper information indicating "A4"

In the case of a combination of the print setting information indicating "letter" and the paper information indicating "letter"

In the case of a combination of the print setting information indicating "postcard" and the paper information indicating "postcard"

In the case of a combination of the print setting information indicating "postcard" and the paper information indicating a size other than "postcard", with a supplementary condition that the media in the print setting information and the paper information is "postcard"

Although FIG. 6 shows an example of some types of media and size, it should be noted that, of course, conditions regarding all kinds of media types and all sizes supported by the printer 101 and the PC 102 are stored in the printability information 108. If the conditions of both the media and the size are satisfied, it is determined that printing can be performed, and if the conditions of at least one of the media and the size are not satisfied, it is determined that the combination is inadequate and printing cannot be performed.

Figure 7:
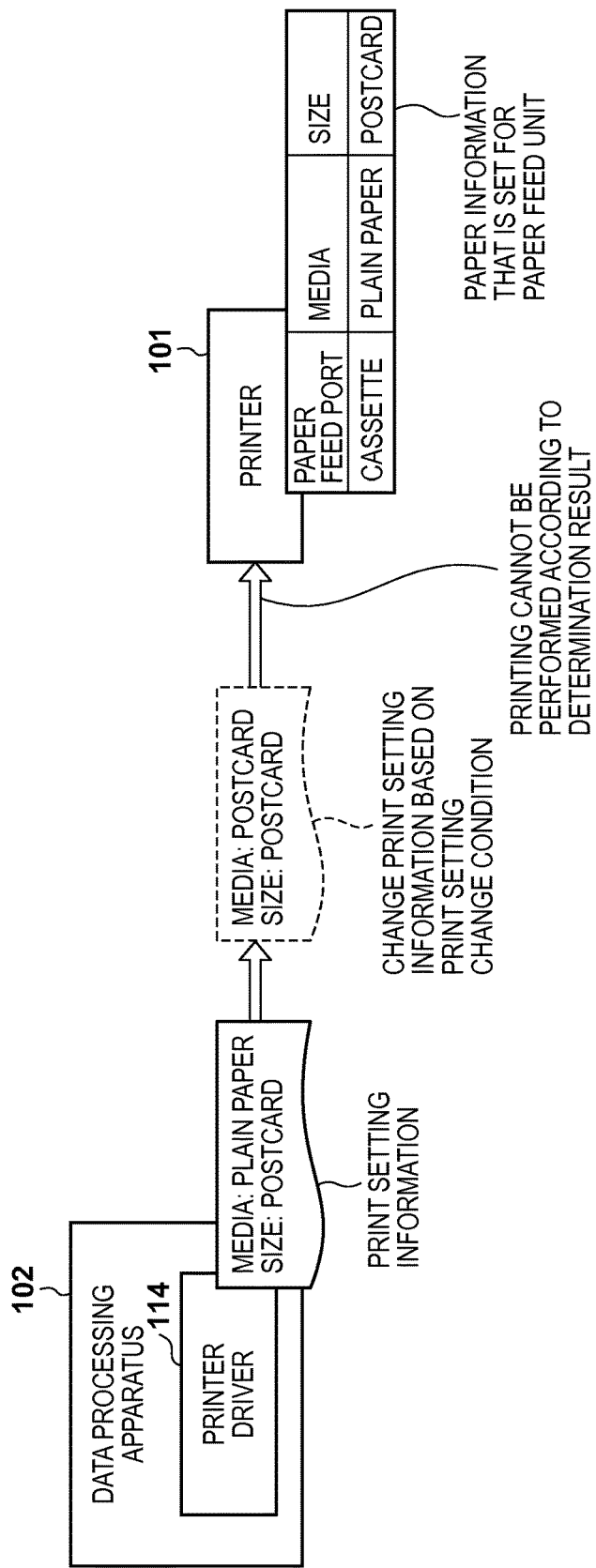
FIG. 7 is a diagram showing a case of determining whether printing can be performed, using print setting information and paper information without using the printability information.

FIG. 7 is a diagram showing a case of determining whether or not the print data is printable, using the print setting information in the print data transmitted to the printer 101 and the paper information 104 of the printer 101, without using the printability information 108. Usually, in the case where information such as the printability information 108 is not particularly provided, it is determined that printing cannot be performed unless the information of the media and the size in the print setting information in the print data transmitted to the printer 101 completely coincides with that in the paper information 104 of the printer 101.

An example thereof will be described below using FIG. 7. In the print setting information set by the print setting unit 121, "plain paper" is set as the media and "postcard" is set as the size. For this reason, the PC 102 changes, before generating the print data, the media from "plain paper" to "postcard" under a print setting change condition in FIG. 5 stored in the print setting change unit 120, then generates the print data, and transmits the print data to the printer 101. Accordingly, the printer 101 determines whether printing can be performed, by comparing the print setting information in which the media changed by the print setting change unit 120 is "postcard" and the size is "postcard" with the paper information 104 in which the media is "plain paper" and the size is "postcard". As a result, the sizes match but the media do not match, and accordingly the printer determines that printing cannot be performed. If it is determined that printing cannot be performed, the printer 101 displays a warning screen indicating inadequacy of the print settings on the display unit 109 of the printer 101.

An exemplary display of a warning screen 800 indicating the information regarding the inadequacy of the print settings is shown in FIG. 8. In this example, a character string indicating that the content of the print setting information in the print data transmitted to the printer 101 does not match the content of the paper information 104, and information of the media and the size in the print setting information in the print data transmitted to the printer 101, are displayed. This is an example in the case where the media and the size in the print setting information in the print data transmitted to the printer 101 are "glossy paper" and "L", respectively. When performing a warning display in the example in FIG. 7, since the media is "postcard" and the size is "postcard" in the print setting information, a warning screen is displayed, indicating that both the media and the size are "postcard".

Note that this warning screen 800 may be displayed not on the display unit 109 of the printer 101 but on the notification unit 113 of the PC 102. Also, the warning screen 800 may be displayed on both the display unit 109 and the notification unit 113.

In the case of the situation in FIG. 7, the media and the size are "plain paper" and "postcard", respectively, in the print settings configured by the print setting unit 121 and both match the content of the media and the size in the paper information 104, and therefore the user does not understand why it is determined that printing cannot be performed. For this reason, to avoid this, the printability information 108 is used in the present embodiment.

Figure 9:
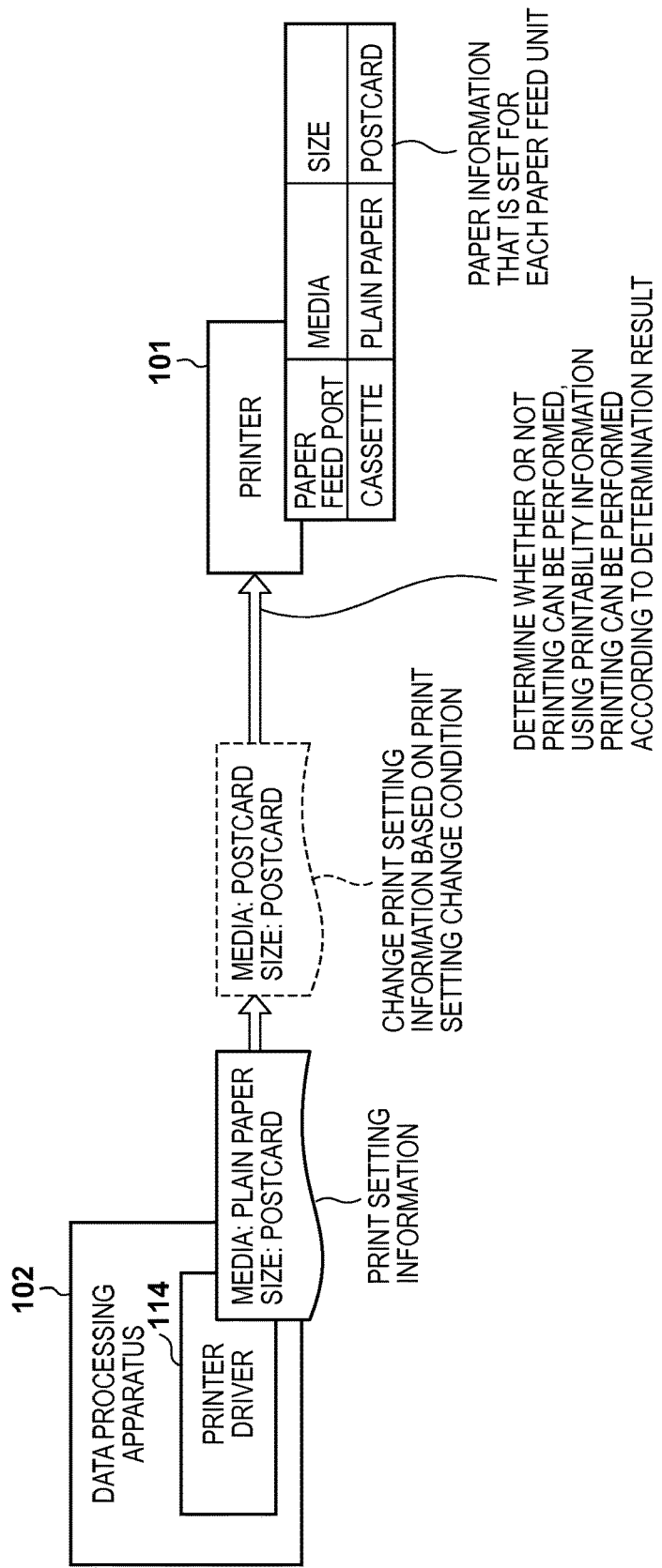
FIG. 9 is a diagram showing a case of determining whether printing can be performed, using the printability information in addition to the print setting information and the paper information.

FIG. 9 is a diagram showing a case of determining whether or not the print data is printable, using the printability information 108 in FIG. 6 in addition to the print setting information in the print data transmitted to the printer 101 and the paper information 104 of the printer 101. In the print setting information set by the print setting unit 121, "plain paper" is set as the media and "postcard" is set as the size. For this reason, the PC 102 changes, before generating the print data, the media from "plain paper" to "postcard" based on the print setting change condition in FIG. 5 stored in the print setting change unit 120, then generates the print data, and transmits the print data to the printer 101. The printer 101 determines whether or not the print data is printable from the printability information 108 in FIG. 6, based on the print setting information in which the media changed by the print setting change unit 120 is "postcard" and the size is "postcard", and the paper information 104 in which the media is "plain paper" and the size is "postcard".

Initially, the printer 101 determines whether or not the media is printable. Regarding the media condition in the printability information 108, the relationship between the print setting information and the paper information matches a printable condition that the print setting information indicates "postcard", the paper information 104 indicates "plain paper", and the supplementary condition is "when the size in the print setting information and the paper information is postcard". Accordingly, the printer 101 determines that the media is printable. Subsequently, the printer 101 determines whether or not the size is printable. Regarding the size condition in the printability information 108, the relationship between the print setting information and the paper information matches a printable condition that the print setting information indicates "postcard" and the paper information 104 indicates "postcard". Accordingly, the printer 101 determines that the size is printable. Accordingly, since it is determined that both the media and the size are printable, printing is executed in the printer 101.

Figure 10:
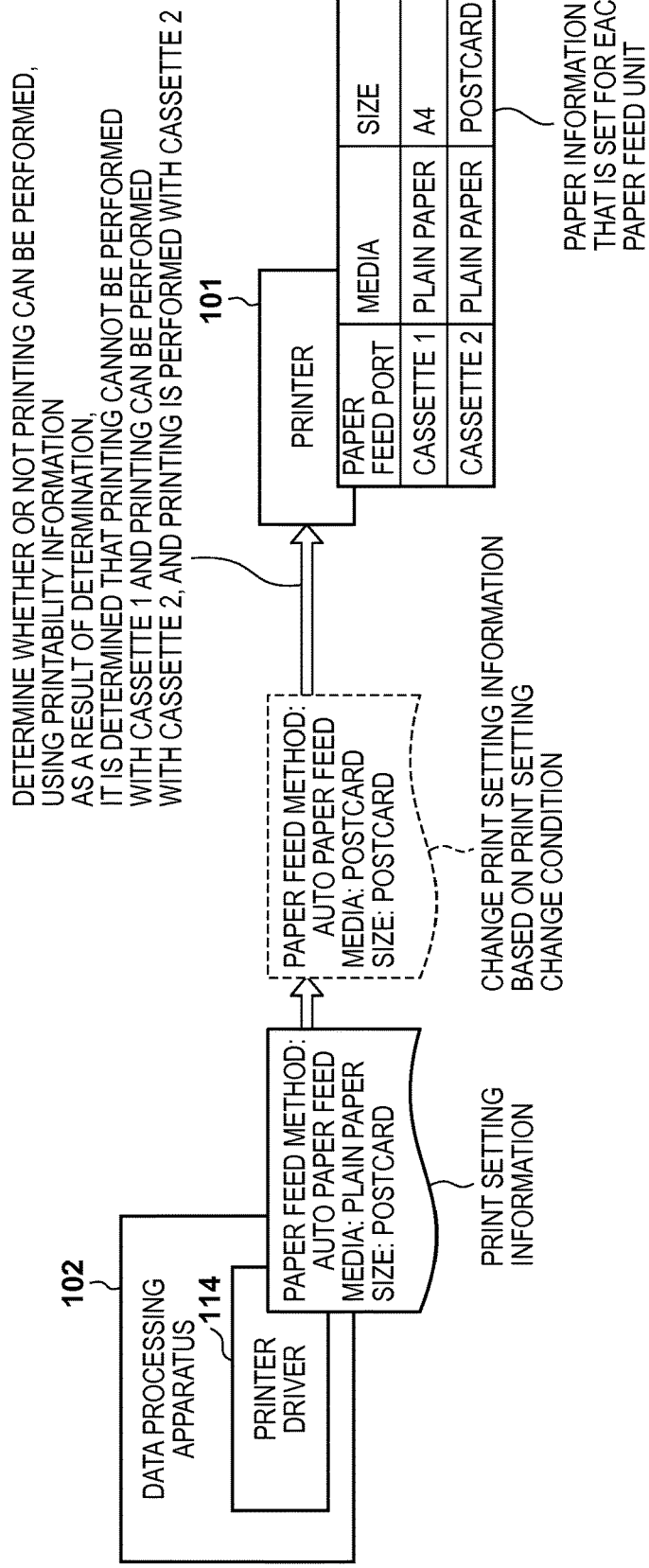
FIG. 10 is a diagram showing an exemplary printer including a plurality of paper feed units.

FIG. 9 shows an exemplary case where one paper feed unit is provided in the printer 101, whereas, for example, FIG. 10 shows an exemplary case where a plurality of paper feed units are provided in the printer 101. As in FIG. 9, the PC 102 generates the print data after changing the media from "plain paper" to "postcard" based on the print setting change condition in FIG. 5, and transmits the print data to the printer 101. The print setting information in the print data usually includes a paper feed method. For example, if "auto paper feed" is set as the paper feed method, the printer 101 determines the paper feed unit with which printing is performed, based on the print setting information and the paper information 104.

In the print setting information in FIG. 10, the media: "postcard" and the size: "postcard" are set. In the paper information of the cassette 1 in the printer 101, the media: "plain paper" and the size: "A4" are set. Accordingly, the printer 101 determines regarding the cassette 1 that printing cannot be performed, since the relationship between the print setting information and the paper information does not match the printable conditions. On the other hand, in the paper information of the cassette 2 in the printer, the media: "plain paper" and the size: "postcard" are set. Accordingly, the printer 101 determines regarding the cassette 2 that printing can be performed, since the relationship between the print setting information and the paper information matches the printable conditions. Based on the above results, the printer 101 feeds paper from "cassette 2" to execute printing. If not the auto paper feed but a physical paper feed port (e.g., cassette 1 or cassette 2) is set in the print setting information, the printer 101 determines whether or not printing can be performed, using only the paper information 104 of the paper feed unit set in the print setting information.

Although it is determined that printing can be performed with one paper feed unit in the example in FIG. 10, there are also cases where it is determined that printing can be performed with a plurality of paper feed units. In this case, for example, processing is conceivable in which a priority paper feed unit is determined in advance and printing is executed using this priority paper feed unit. Also, under some circumstances, it is determined that printing can be performed with none of the paper feed units. In this case, the warning screen 800 shown in FIG. 8 is displayed.

Figure 11:
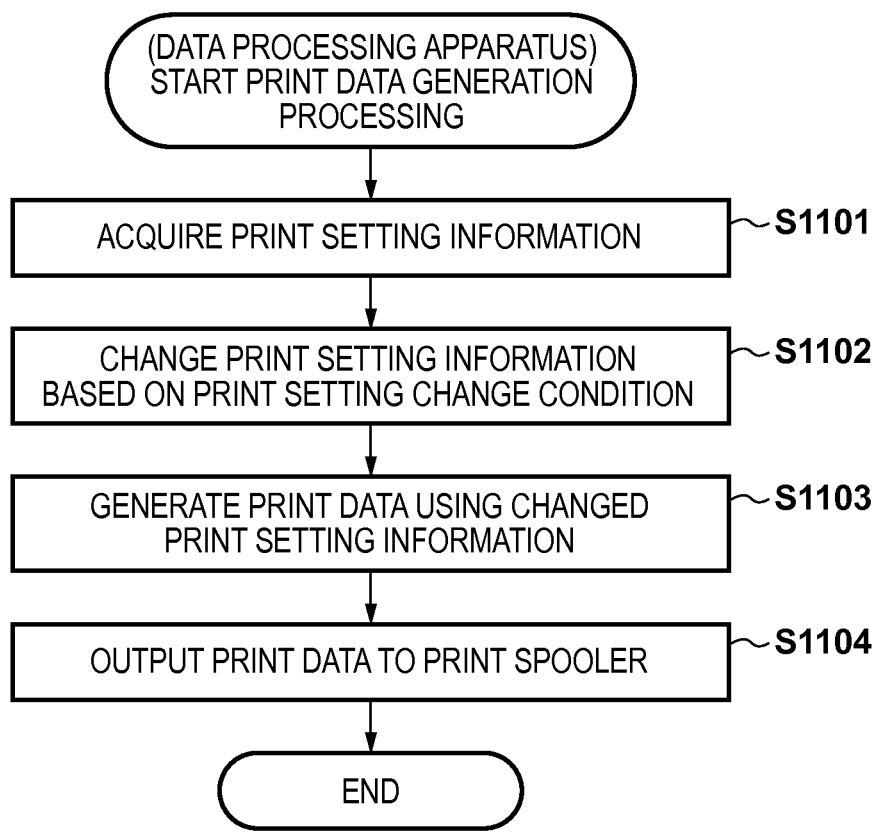
FIG. 11 is a flowchart showing print data generation processing in Embodiment 1.

Next, print data generation processing executed in the PC 102 will be described using the flowchart in FIG. 11. Note that the flowchart in FIG. 11 executed in the PC 102 is achieved by the central control unit 111 reading out a program relating to the flowchart from the ROM in the storage unit 150 and executing this program.

The central control unit 111 acquires the print setting information set by the print setting unit 121 (S1101). This print setting information includes setting items such as the media, the size, the paper feed method, and the print quality. Next, the central control unit 111 changes the acquired print setting information based on the print setting change conditions in FIG. 5 (S1102). The central control unit 111 generates the print data using the changed print setting information (S1103). The central control unit 111 outputs the generated print data to the print spooler 115 (S1104).

After the print data is output to the print spooler 115, the print data is transmitted to the printer 101, and printing processing is started in the printer 101. The printing processing in the printer 101 will now be described using FIG. 12. Note that a flowchart in FIG. 12 executed in the printer 101 is achieved by the print control unit 106 reading out a program relating to the flowchart stored in the ROM in the storage unit 160 and executing this program.

Initially, the print control unit 106 acquires the print setting information from the print data received from the PC 102 (S1201). Next, the print control unit 106 acquires the paper information 104 from the storage unit 160 (S1202), and further acquires the printability information 108 from the storage unit 160 (S1203). The print control unit 106 then executes printability determination processing using a series of information acquired in each step (S1204).

The details of this printability determination processing will now be described below using a flowchart in FIG. 13.

The print control unit 106 determines whether or not a result of comparison between the print setting information acquired in step S1201 and the paper information 104 acquired in step S1202 corresponds to a printable condition in the printability information 108 acquired in step S1203 (S1301 and S1302). Specifically, the print control unit 106 determines whether a result of comparison between the media in the print setting information and the media in the paper information coincides with a printable condition, as mentioned above. Furthermore, the print control unit 106 determines whether a result of comparison between the size in the print setting information and the size in the paper information coincides with a printable condition.

The print control unit 106 determines whether or not the respective determination results in steps S1301 and S1302 indicate that printing can be performed (S1303). If the results indicate that printing can be performed (YES in S1303), the print control unit 106 starts printing (S1304). On the other hand, if the results indicate that printing cannot be performed (NO in S1303), the print control unit 106 performs a warning display (e.g., the warning screen 800 in FIG. 8) indicating that the print settings are inadequate (S1305). The print control unit 106 stops printing (S1306).

Although a configuration is employed in which printing is stopped in step S1306, it should be noted that the configuration is not limited thereto. For example, printing may be continued while displaying the warning screen 800, or the printability determination processing may be executed again after updating the settings of the paper information 104.

As described above, according to Embodiment 1, it is determined whether or not printing can be performed, using the print setting information and the paper information 104 of the printer 101, as well as the printability information indicating a combination of the print setting information and the paper information 104 with which printing can be performed with the paper feed units. A warning display is performed if it is determined that the printing settings are inadequate, and accordingly, even if the print settings are changed based on a print setting change condition, the determination that print cannot be performed and the warning display against the user's intention can be avoided.

Embodiment 2

Figure 14:
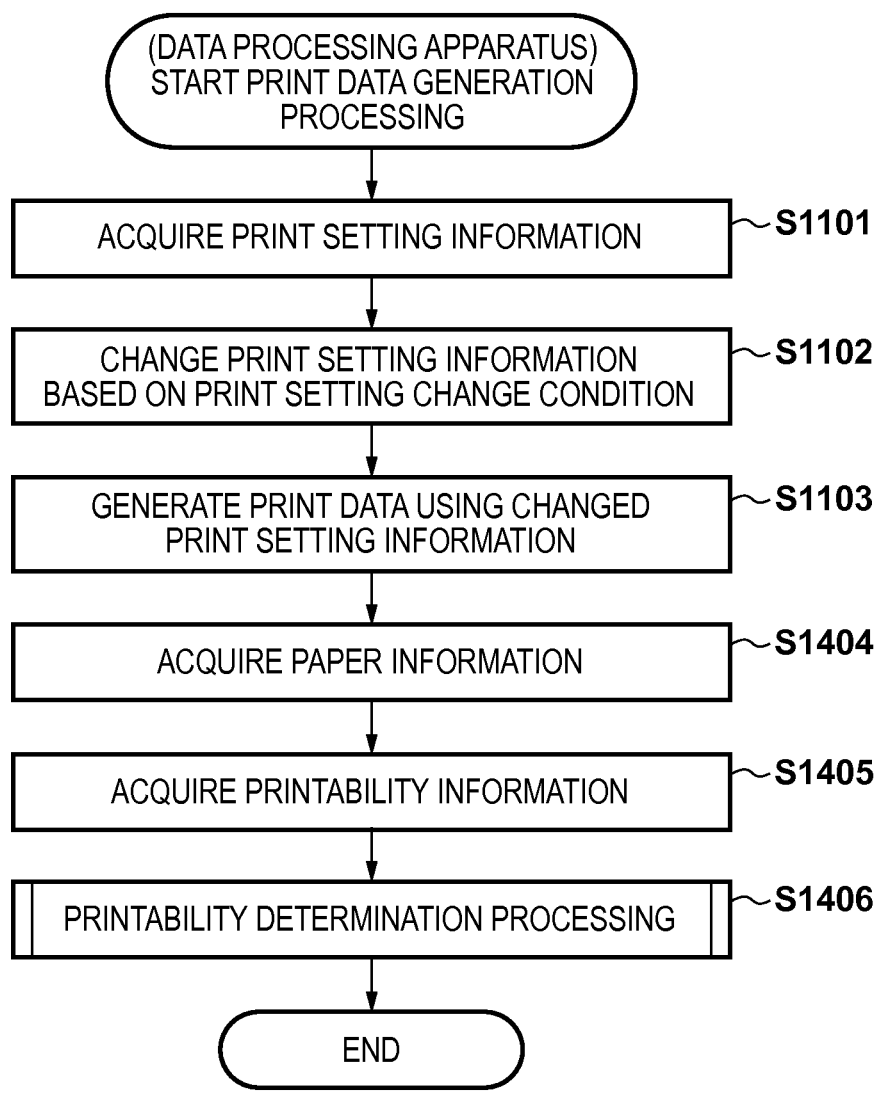
FIG. 14 is a flowchart showing print data generation processing in Embodiment 2.

Embodiment 1 has described a configuration in which the printability determination processing is performed in the printer 101, whereas Embodiment 2 will describe a configuration in which the printability determination processing is performed in the data processing apparatus 102. The printability determination processing executed in the PC 102 will be described using FIG. 14. Note that, in FIG. 14, the same processing as that in FIG. 11 in Embodiment 1 will be given the same step number, and a detailed description thereof will be omitted.

After generating the print data in step S1103 through the processing in steps S1101 and S1102, the central control unit 111 acquires the paper information 104 from the printer 101 (S1404), and subsequently acquires the printability information 108 from the printer 101 (S1405). Note that the paper information 104 of the printer 101 and the printability information 108 are acquired via the data communication unit 119 of the PC 102. The central control unit 111 then executes the printability determination processing using a series of information acquired in each step (S1406).

Figure 15:
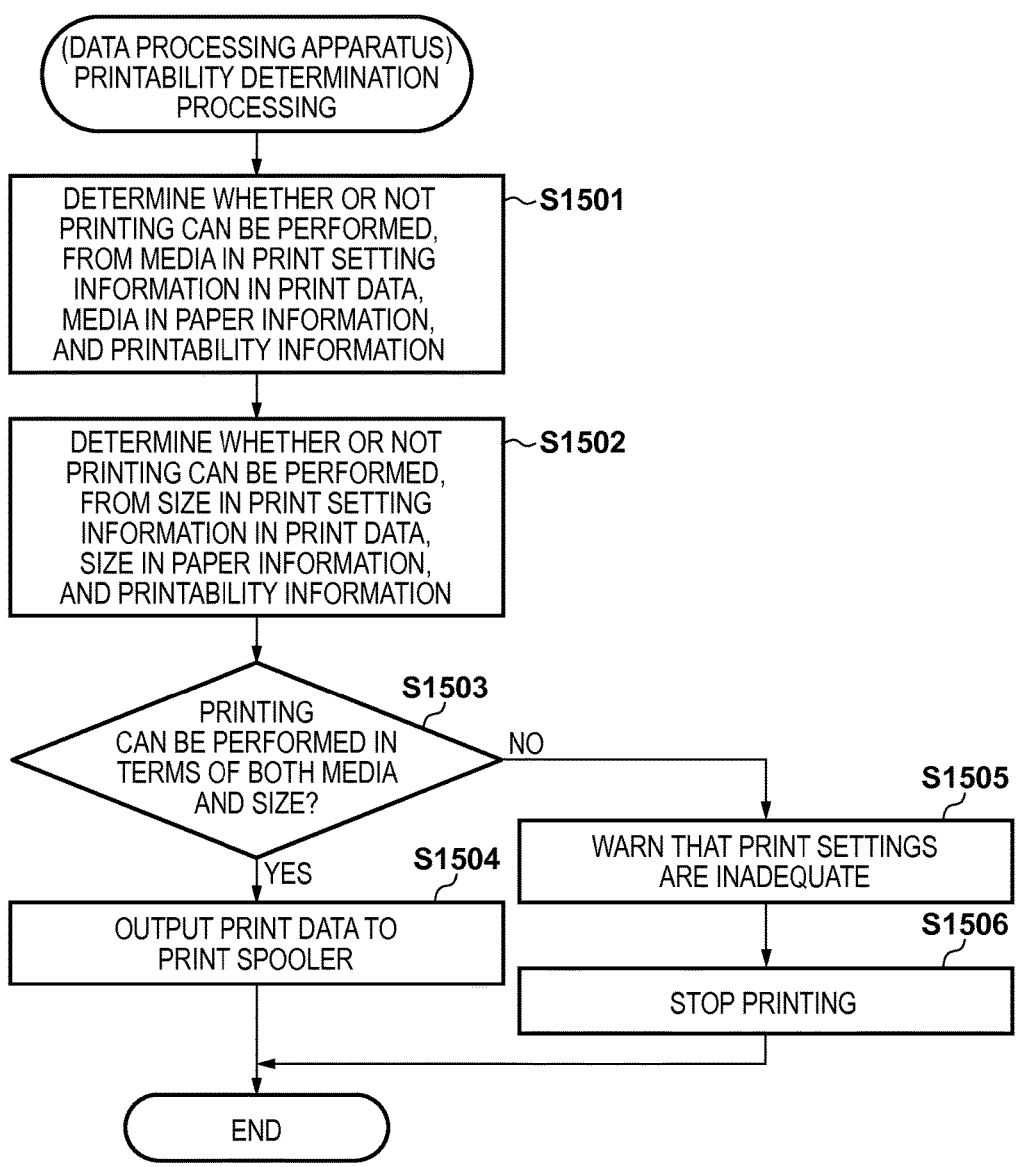
FIG. 15 is a flowchart showing printability determination processing in Embodiment 2.

The details of this printability determination processing will now be described below using a flowchart in FIG. 15. When performing the printability determination processing in the PC 102, it should be noted that the monitoring unit 118 of the printer driver 114 performs the processing under the control of the central control unit 111.

The monitoring unit 118 determines whether or not a result of comparison between the print setting information in the print data generated in step S1103 and the paper information 104 acquired in step S1404 corresponds to a printable condition in the printability information 108 acquired in step S1405 (S1501 and S1502). Specifically, the monitoring unit 118 determines whether a result of comparison between the media in the print setting information and the media in the paper information coincides with a printable condition. Furthermore, the monitoring unit 118 determines whether a result of comparison between the size in the print setting information and the size in the paper information coincides with a printable condition.

The monitoring unit 118 determines whether or not the respective determination results in steps S1501 and S1502 indicate that printing can be performed (S1503). If the results indicate that printing can be performed (YES in S1503), the monitoring unit 118 outputs the print data to the print spooler 115 (S1504). On the other hand, if the results indicate that printing cannot be performed (NO in S1503), the monitoring unit 118 performs a warning display (the warning screen 800 in FIG. 8) indicating that the print settings are inadequate, via the notification unit 113 (S1505). The monitoring unit 118 stops printing (S1506).

Although a configuration is employed in which printing is stopped in step S1506, it should be noted that the configuration is not limited thereto. For example, the print data may be output to the print spooler 115 while displaying the warning screen 800, or a configuration may be employed in which the printer 101 is caused to update the settings of the paper information 104, the paper information 104 is again acquired, and the printability determination processing is executed.

As described above, according to Embodiment 2, in addition to the effect described in Embodiment 1, the printability determination processing is executed in the PC 102, and thereby, if printing cannot be performed, the user can be warned thereabout before the print data is transmitted to the printer 101.

Furthermore, as described in Embodiment 2, the printability determination processing can be achieved not only in the printer 101 but also in the PC 102. That is to say, the printer 101 and the PC 102 functions as print control apparatuses that control printing based on the print data, and a print control system in which printing is controlled by these printer 101 and PC 102 is achieved.

Embodiment 3

The configurations in Embodiments 1 and 2 have the following two features.

A first feature is as follows. In Embodiments 1 and 2, even if the print setting information is changed based on a print setting change condition, the printability information 108 is used to determine whether printing can be performed. In the case of this configuration, the change of the print setting information generated by a print setting operation by the user based on the print setting change condition is executed before the print data is generated, and accordingly the user usually does not notice whether the print setting information has been changed, and is not notified of the change either. In this case, there are cases where it is determined that printing can be performed and the printing is performed even if the print setting information set by the user (the print setting information before being changed based on a print setting change condition) does not match the settings of the paper information 104 of the printer 101.

Figure 16:
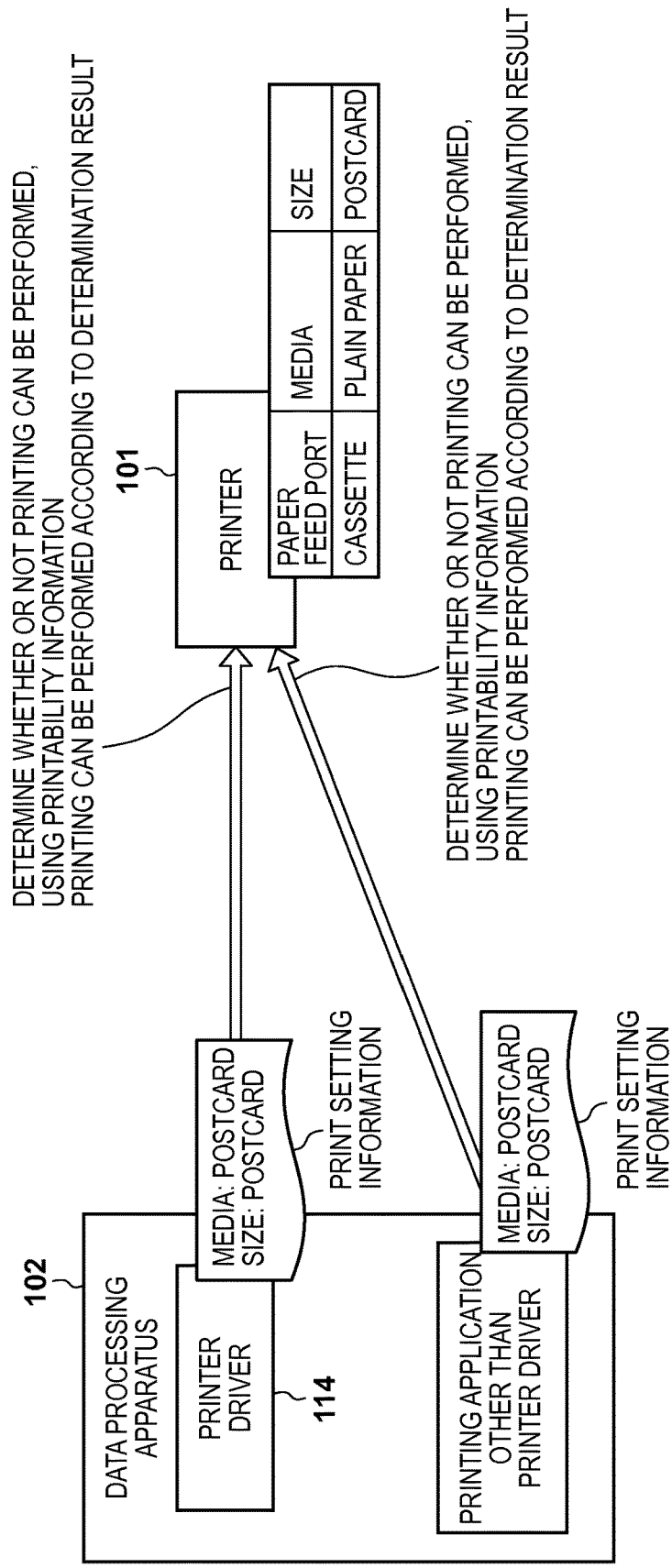
FIG. 16 is a diagram showing a specific example of a first feature of Embodiments 1 and 2.

A specific example will now be described using FIG. 16. Assume that the user sets, on the printer driver 114, "postcard" as the media and "postcard" as the size in the print setting information, and executes printing. The print setting change unit 120 of the printer driver 114 does not change the print setting information, based on a print setting change condition in FIG. 5, generates the print data using the original print setting information, and transmits the print data to the printer 101.

The printer 101 determines whether or not the combination of the print setting information in the print data received from the PC 102 and the paper information 104 indicates that printing can be performed, using the printability information 108 in FIG. 6, determines that printing can be performed, and executes the printing. That is to say, even if the media: "postcard" in the print setting information does not match the media: "plain paper" in the paper information 104, the warning screen is not displayed, and the printing is performed.

A similar thing also occurs when performing printing with the same print setting information ("postcard" as the media and "postcard" as the size) from a printing application that does not have a function of changing the print setting information based on a print setting change condition. The above is the first feature.

A second feature is as follows. In Embodiments 1 and 2, the print setting information is changed based on a print setting change condition, determines whether or not printing can be performed using the printability information 108, and the warning display is performed if printing cannot be performed. As this warning display, the content of the print setting information after being changed is displayed. That is to say, print setting information that is different from the print setting information set by the user himself/herself is displayed.

Figure 17:
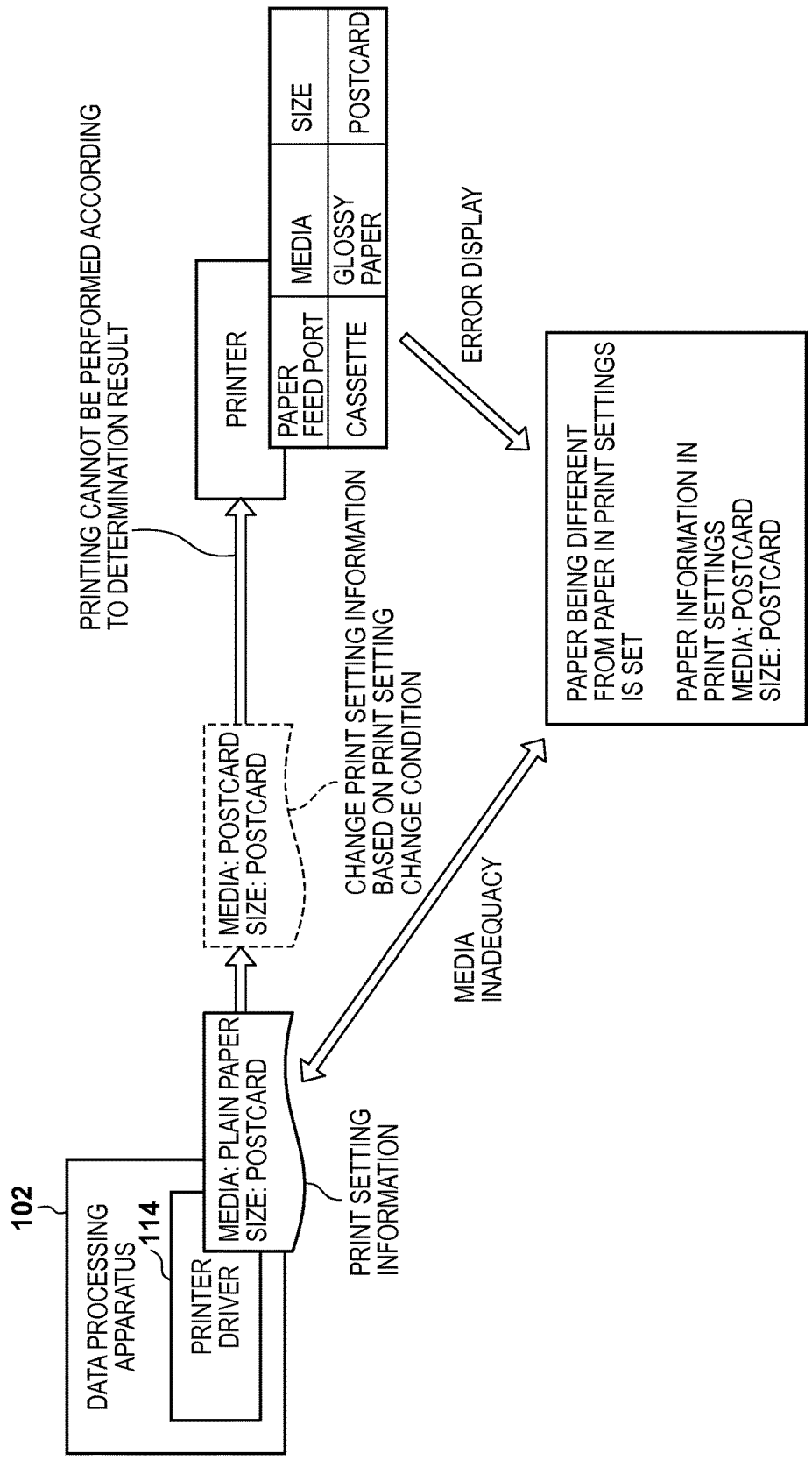
FIG. 17 is a diagram showing a specific example of a second feature of Embodiments 1 and 2.

A specific example will now be described using FIG. 17. Assume that the user sets, on the printer driver 114, "plain paper" as the media and "postcard" as the size in the print setting information, and executes the printing. The print setting change unit 120 of the printer driver 114 changes the media from "plain paper" to "postcard" based on a print setting change condition in FIG. 5, generates the print data, and transmits the print data to the printer 101.

The printer 101 determines whether or not the combination of the print setting information in the print data received from the PC 102 and the paper information 104 indicates that printing can be performed, using the printability information 108 in FIG. 6. In this case, regarding the media, the print setting information, which indicates "postcard", does not match the paper information 104, which indicates "glossy paper", it is therefore determined that printing cannot be performed, and a warning display (error display) is performed. As the paper information in the warning display, the media after being changed, i.e., "postcard" is displayed, and therefore a print setting that is different from "plain paper" set by the user is displayed. As a result, a warning display is performed that includes print setting information that is different from the print setting information set by the user himself/herself. The above is the second feature.

Considering these two features, in Embodiment 3, information indicating that the print setting information has been changed (print setting change information) and print setting information before being changed in relation to the print setting information after being changed are included in the print setting information in the print data and are transmitted to the printer 101. Furthermore, determination of whether or not the print setting change information is included in the print setting information is added to the supplementary condition in the printability information 108 of the printer 101. In the case where a result of the printability determination is that printing cannot be performed, the print setting change information as well as the print setting information before being changed are displayed in the warning display, if the print setting information includes the print setting information before being changed.

FIG. 18 shows an example in which the determination of whether or not the print setting change information is included in the print setting information is added to the supplementary condition in the printability information 108. Regarding the supplementary condition of the media, in the case where the media in the print setting information is "postcard" and the media in the paper information 104 is "plain paper", a condition "when the print setting change information exists" is added to a condition "only when the size in the print setting information and the paper information is postcard". Printing with a combination of the print setting information indicating "postcard" and the paper information 104 indicating "plain paper" can thereby be enabled only when the print setting information is changed by the print setting change unit 120. Also, regarding the size as well, similarly, in the case where the size in the print setting information is "postcard" and the size in the paper information 104 is other than "postcard, a condition "when the print setting change information exists" is added to a condition "only when the media in the print setting information and the paper information is postcard". Printing with a combination of the print setting information indicating "postcard" and the paper information 104 indicating a size other than "postcard" can thereby be enabled only when the print setting information is changed by the print setting change unit 120.

Figure 19:
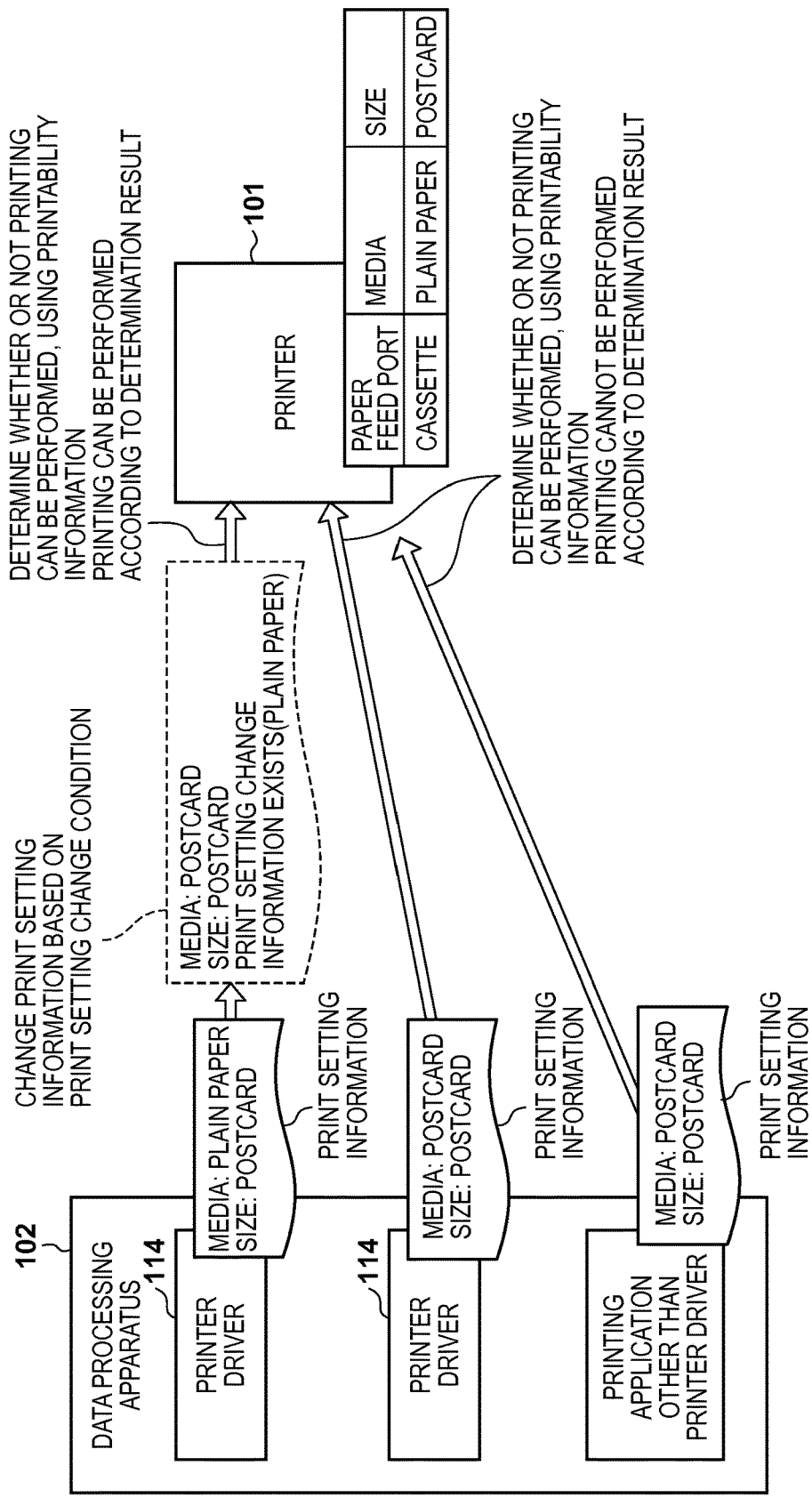
FIG. 19 is a diagram showing processing for the first feature of Embodiments 1 and 2.

Exemplary processing regarding the first feature in Embodiment 3 will be described using FIG. 19. Assume that the user sets, on the printer driver 114, "plain paper" as the media and "postcard" as the size in the print setting information, and executes the printing. The print setting change unit 120 of the printer driver 114 changes the media from "plain paper" to "postcard" based on a print setting change condition in FIG. 5. Then, since the print setting information is changed, print data is generated such that the print setting change information and the print setting information before being changed (in this example, "plain paper") are included in the print setting information after being changed, and the print data is transmitted to the printer 101.

The printer 101 determines whether or not the combinations of the media and of the sizes in the print setting information in the print data received from the PC 102 and the paper information 104 indicates that printing can be performed, using the printability information 108 in FIG. 18. Regarding the media, the combination of the media matches the combination of the print setting information indicating "postcard" and the paper information 104 indicating "plain paper" with the supplementary condition "only when the size in the print setting information and the paper information is postcard, and when the print setting change information exists" in the printability information 108, and it is accordingly determined that printing can be performed. Regarding the size as well, both the print setting information and the paper information 104 indicate "postcard" and match a printable condition, and it is accordingly determined that printing can be performed. As a result, since both the media and the size match between the print setting information and the paper information 104, it is determined that printing can be performed, and the printing is executed.

Next, assume that the user sets, on the printer driver 114, "postcard" as the media and "postcard" as the size in the print setting information, and executes the printing. The print setting change unit 120 of the printer driver 114 does not change the print setting information based on a print setting change condition in FIG. 5, and therefore generates the print data in which the print setting information does not include the print setting change information, and transmits the print data to the printer 101.

The printer 101 determines whether or not the combinations of the media and of the sizes in the print setting information in the print data received from the PC 102 and the paper information 104 indicate that printing can be performed, using the printability information 108 in FIG. 18. Regarding the media, the combination of the media does not match the combination of the print setting information indicating "postcard" and the paper information 104 indicating "plain paper" with the supplementary condition "when the print setting change information exists" in the printability information 108, and therefore the printer 101 determines that the media is not printable.

The same applies to a case of executing printing with the same print setting information (the media is "postcard" and the size is "postcard") from a printing application that does not have a function of changing the print setting information based on a print setting change condition. That is to say, the combination of the media does not match the combination of the print setting information indicating "postcard" and the paper information 104 indicating "plain paper" with the supplementary condition "when the print setting change information exists" in the printability information, and therefore the printer 101 determines that printing cannot be performed.

That is to say, an object of Embodiment 3 is that, even in the case where it is determined that printing cannot be performed, printing processing is executed based on the printability information if the change has been performed by the print setting change unit 120.

Figure 20:
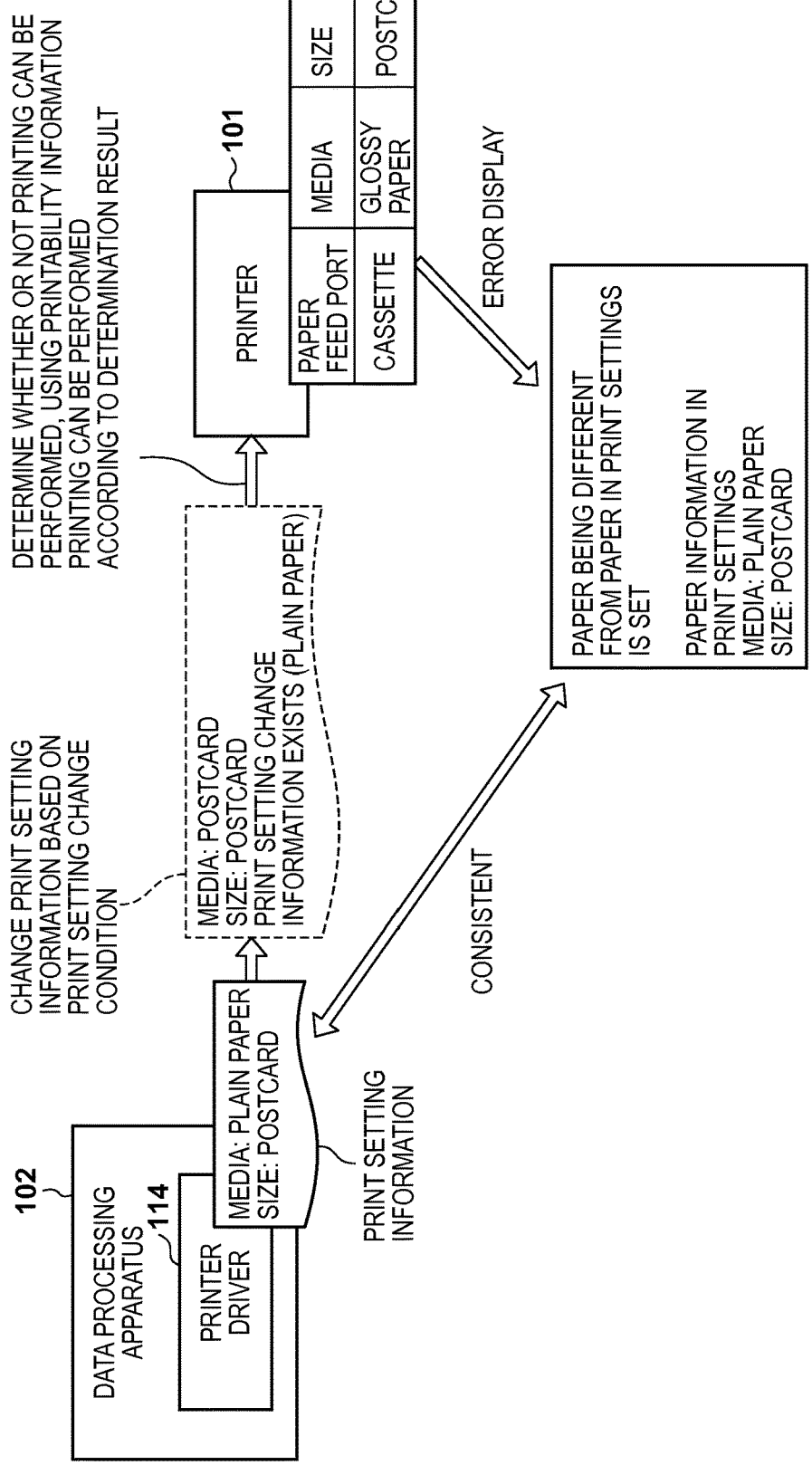
FIG. 20 is a diagram showing processing for the second feature of Embodiments 1 and 2.

Next, exemplary processing regarding the second feature in Embodiment 3 will be described using FIG. 20. Assume that the user sets, on the printer driver 114, "plain paper" as the media and "postcard" as the size in the print setting information, and executes the printing. The print setting change unit 120 of the printer driver 114 changes the media from "plain paper" to "postcard" based on a print setting change condition in FIG. 5. Then, since the print setting information is changed, print data is generated such that the print setting change information and the print setting information before being changed (in this example, "plain paper") are included in the print setting information after being changed, and the print data is transmitted to the printer 101.

The printer 101 determines whether or not the combination of the print setting information in the print data received from the PC 102 and the paper information 104 indicates that printing can be performed, using the printability information 108 in FIG. 18. Regarding the media, the print setting information, which indicates "postcard", does not match the paper information 104, which indicates "glossy paper", and therefore it is determined that printing cannot be performed, and the warning display is performed. In the warning display, since the print setting information includes the print setting information before being changed (in this example, "plain paper"), the content of the print setting information before being changed is displayed. That is to say, in this case, "media: plain paper" and "size: postcard" are displayed in the warning display. The warning display including the print setting information that matches the print setting information set by the user can thereby be performed.

Next, print data generation processing executed in the PC 102 will be described using a flowchart in FIG. 21. Note that, in FIG. 21, the same processing as that in FIG. 11 in Embodiment 1 will be given the same step number, and a detailed description thereof will be omitted.

After steps S1101 and S1102, if the print setting information has been changed, the central control unit 111 adds the print setting change information and the print setting information before being changed to the print setting information after being changed (S2103). Thereafter, the print data is generated with the print setting information after being changed to which the print setting change information and the print setting information before being changed have been added, and the generated print data is output to the print spooler 115 (S1104).

After the print data is output to the print spooler 115, the print data is transmitted to the printer 101, and printing processing is started in the printer 101. The processing content itself of the printing processing in the printer 101 is the same as that in FIG. 12 in Embodiment 1 except that there are cases where the print data to which the print setting information including the print setting change information and the print setting information before being changed has been added is received, and accordingly the details thereof will be omitted here.

Figure 13:
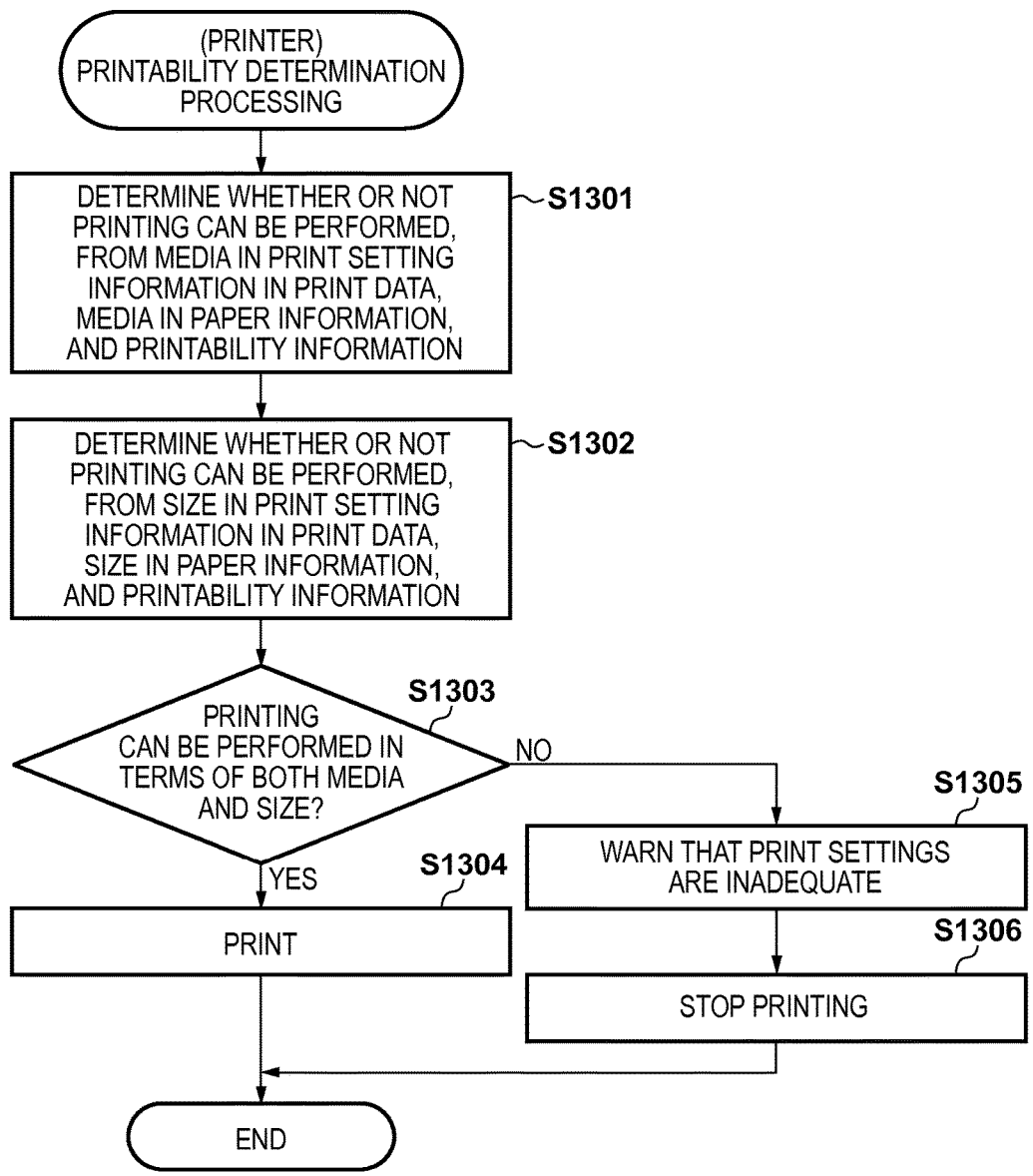
FIG. 13 is a flowchart showing printability determination processing in Embodiment 1.

However, in the case where the print setting change information and the print setting information before being changed are included in the print setting information in the printability determination processing, the processing described above using FIGS. 19 and 20, i.e., processing considering the existence of the print setting change information and the print setting information before being changed is further performed in the determination in steps S1301 and S1302 in FIG. 13 in Embodiment 1. Regarding the display of the warning screen 800 in step S1305, if the print setting change information and the print setting information before being changed are included in the print setting information, the warning screen 800 including the print setting change information and the print setting information before being changed is displayed.

Figure 21:
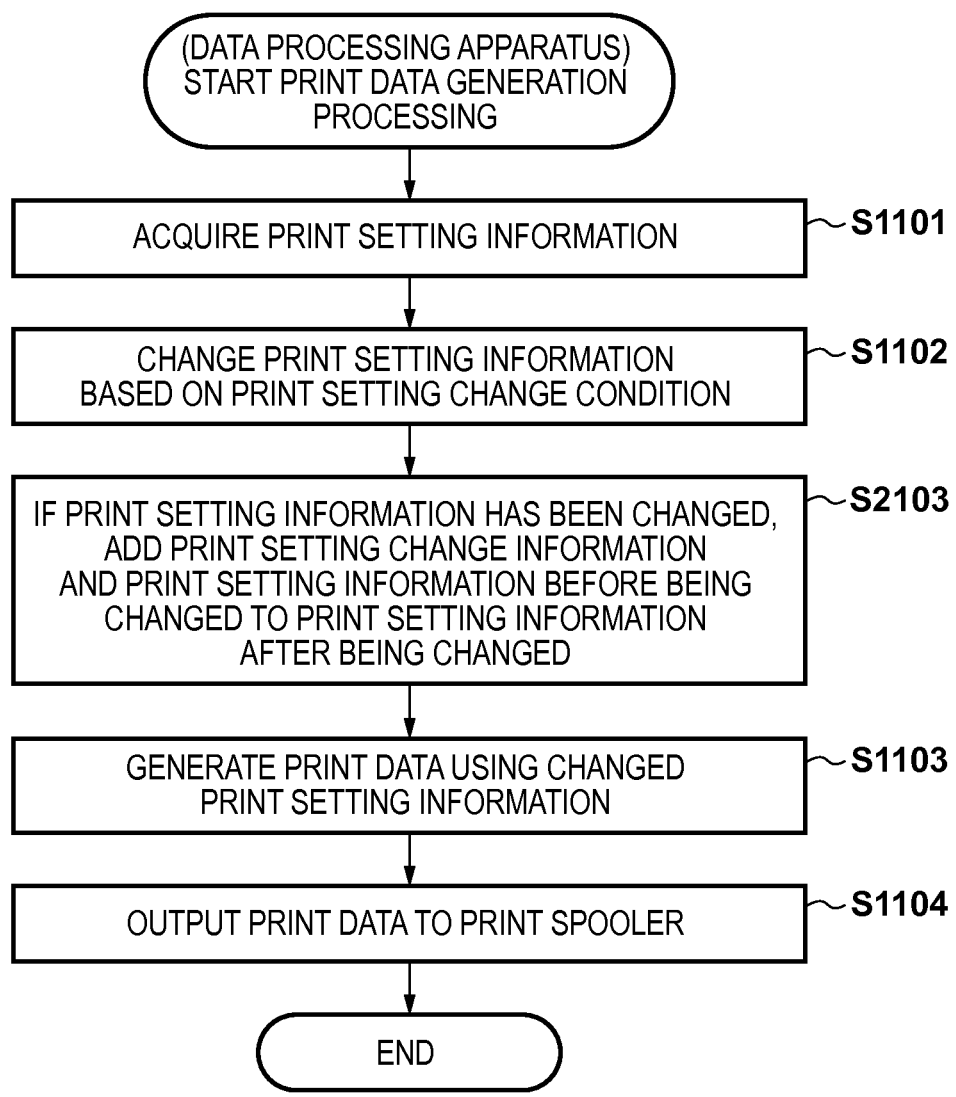
FIG. 21 is a flowchart showing print data generation processing in Embodiment 3.

Although FIG. 21 employs a configuration in which the PC 102 adds, to the print data, the print setting information including the print setting change information and the print setting information before being changed and transmits the print data to the printer 101, it should be noted that the configuration is not limited thereto. For example, the print setting change information and the print setting information before being changed may be transmitted as separate data to the printer 101. In this case, the print data including the print setting information after being changed and the separate data include identification information indicating that the print data and the separate data are associated with each other.

The printability determination processing executed in the printer 101 in Embodiment 3 can also be executed in the PC 102 as in Embodiment 2.

As described above, according to Embodiment 3, in addition to the effects described in Embodiments 1 and 2, in the case of performing a warning display indicating that printing cannot be performed after the print setting information is changed based on a print setting change condition, the print setting information before being changed can be displayed. The user can thereby easily check that the print setting information has been changed and the reason therefor.

Embodiment 4

The above embodiments have described a case of displaying the warning screen shown in FIG. 8 if the printer 101 or the PC 102 determines that either the media or the size in the print setting information and in the paper information 104 are inadequate. On the other hand, there are cases where a warning occurs that is to be given priority over the aforementioned warning.

For example, the printer 101 has a manual two-sided printing function in some cases. With this function, print data of odd-numbered pages within print data including a plurality of pages is initially transmitted to the printer 101, and printing on front faces of paper is completed. Thereafter, a paper bundle in which the odd-numbered pages have been printed is turned over and is reset in the paper feed unit, and, upon a continuation instruction being given, the print data of even-numbered pages is subsequently transmitted to execute printing on back faces of the paper, thereby achieving two-sided printing. Note that the continuation instruction may be given on the PC or the printer 101.

This manual two-sided printing function is achieved by the print data generation unit 116 rearranging page order of the print data such that odd-numbered pages come first and even-numbered pages come next, and inserting, into the print data, a command that enables a border between the odd-numbered pages and the even-numbered pages to be identified. On the other hand, if print setting information is set in which this manual two-sided printing is not applied to the first several pages and the manual two-sided printing is applied from a middle page, the print data generation unit 116 cannot generate print data due to contradiction in the print settings, and stops the printing. The notification unit 113 notifies the user of the stop of the printing by the print data generation unit 116 due to the contradiction in the print settings. As the print data generation unit that detects this contradiction in the print settings, a module that performs control relating to a layout is conceivable. For example, in Microsoft Windows (registered trademark) OS, PrintProcessor in a GDI architecture driver, LayoutFilter in an XPS architecture driver, and the like correspond to the aforementioned module.

When the print data of the first several pages that do not require rearrangement in the print data with the contradicting print settings is transmitted to the printer 101, if it is determined that the media and the size is inadequate as in the above embodiments, a warning regarding this inadequacy is displayed on the printer 101 or the PC 102.

However, if the contradiction in the print settings is thereafter detected, the printing cannot be continued even if the user solves the inadequacy of the media or the size, and a notification of the contradiction in the print settings for the manual two-sided printing is given first in some cases. In particular, in the case where the print data generation unit 116 stops generating the print data and gives a notification, control is employed by which the print data generation unit 116 automatically deletes the print job after the notification is given for a certain time period, for the reason that it is difficult to feed a stop instruction from the user back to the print data generation unit 116, for example, in some cases. In this case, if a warning other than the warning about the contradiction in the print settings is displayed, the user cannot understand the reason for the deletion of the print job. Therefore, in the present embodiment, if a contradiction in the print settings occurs that causes the print data generation unit 116 to stop printing, the stop of the printing is preferentially displayed on the notification unit 113. As a result, the occurrence of the contradiction in the print settings is displayed for a certain time period, and accordingly the user can perceive that the cause of the deletion of the print job lies in the print settings.

Note that, in the case where a contradiction in the print settings is detected not in the middle of the print job but at the beginning thereof as well, if a warning display already displays some kind of error state of the printer 101 and preferential notification of a contradiction in the print settings is similarly desired, the contradiction in the print settings is preferentially displayed. On the other hand, a configuration may be employed in which, if the print job whose print settings are contradicting is not the print job of the user himself/herself, some kind of error state of the printer 101 is given priority over the detection of the contradiction in the print settings by the print data generation unit 116.

The contradiction in the print settings detected by the print data generation unit 116 is not limited to the case where the print settings relating to the manual two-sided printing are changed in the middle. For example, there are also cases where, during two-sided printing on media such as plain paper with which printing can be performed on both front and back faces, the media is changed to photo paper or the like with which printing cannot be performed on both front and back faces in the middle of the print job. Other various cases are also conceivable, as in the case where 180-degree rotation processing is applied to a book printing job. The present embodiment is also applicable to these cases.

Embodiment 5

In a general printer, when printing on a document side of a photo postcard, a photo postcard print mode is used as a print mode to perform the printing. On the other hand, when printing on an address side, the printer 101 uses a postcard print mode as the print mode to perform the printing.

When the user prints on a document side of a photo postcard, the user selects "photo postcard" as the media type in the print setting information on the printer driver 114. The printer driver 114 then generates the print data based on the print setting information and application data to be printed, and transmits the print data to the printer 101.

After the user sets "photo postcard" as the media in the paper information of the printer 101, if the aforementioned print data is received, the printer 101 determines in the printability determination processing that printing can be performed, and executes the printing.

On the other hand, when the user prints on the address side of the photo postcard, the printing needs to be performed in the postcard print mode, and it is accordingly necessary to select "postcard" as the media in the print setting information on the printer driver 114. The printer driver 114 generates the print data while setting "postcard" as the media information in the print setting information, and transmits the print data to the printer 101. In this case, the printer 101 performs the printability determination processing using "postcard" indicated by the print setting information in the print data. For this reason, in order to enable the printing, even though the printing is to be performed on the photo postcard media, the user needs to set "postcard" as the media in the paper information of the printer 101, and there has been a problem in that this setting is difficult to understand for the user.

To solve this problem, the user initially sets a media type to be set in the printer 101 as the media in the paper information of the printer 101. For example, in either case of printing on the document side or the address side of a photo postcard, the user sets, on the printer, "photo postcard" as the media type if a photo postcard is set in the printer.

The printer driver 114 then provides, as settable media types, options for a document side and for an address side, such as "photo postcard (document side)" and "photo postcard (address side)". The user sets, as the print setting information, "photo postcard (document side)" when printing on the document side of the photo postcard, and sets "photo postcard (address side)" when printing on the address side.

In the printability determination processing in the printer 101, it is determined whether printing can be performed, using the printability information 108 in FIG. 22.

By using the above solving method, for example, when the user prints on the address side of "photo postcard", the user need only set "photo postcard (address side)" as the print setting information of the printer driver 114, and set "photo postcard" as the media in the paper information of the printer 101. As a result, a printing procedure can be provided that is instinctively easy to understand for the user.

Embodiment 6

A printer exists that performs printing using a glossy paper print mode as a print mode when printing on a document side of a photo postcard. An example of this kind of printer is a printer 101 in which the ROM capacity is limited and a photo postcard print mode cannot be separately prepared, and printing is performed in the glossy paper print mode. When printing on a document side of a photo postcard with this kind of printer, "photo postcard" is set as the media type in the print setting information, but the printer driver 114 generates the print data while setting "glossy paper" as the media information in the print setting information, and transmits the print data to the printer 101. The printer 101 performs the printability determination processing with "glossy paper" indicated by the print setting information included in the print data.

Figure 23:
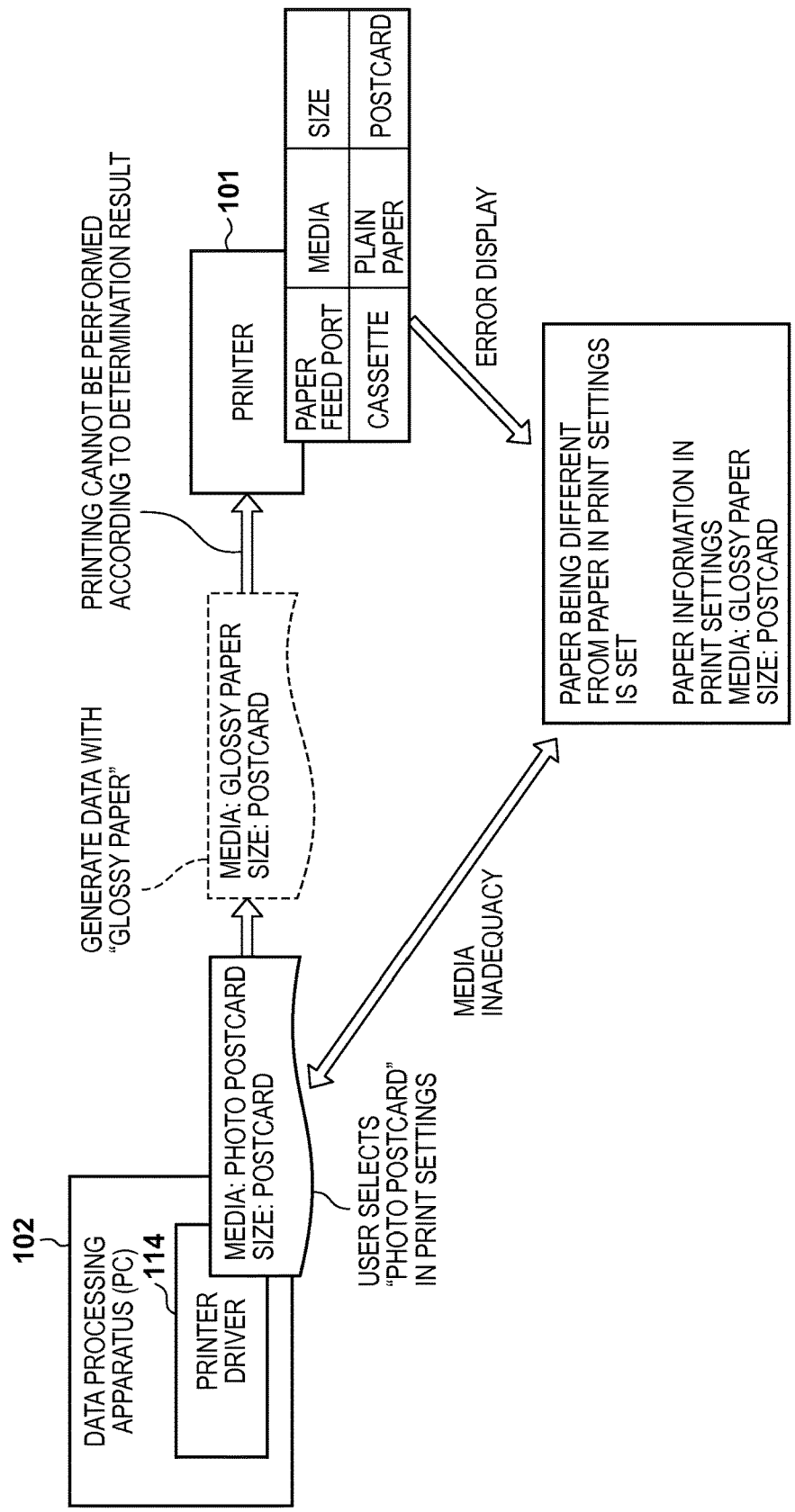
FIG. 23 is a diagram showing a specific example of Embodiment 6.

The above example will now be described using FIG. 23. Assume that the user sets, on the printer driver 114, "photo postcard" as the media type and "postcard" as the size in the print setting information, and executes the printing. The print setting change unit 120 of the printer driver 114 changes the media from "photo postcard" to "glossy paper" to generate the print data, and transmits the print data to the printer 101.

The printer 101 determines whether or not the combination of the print setting information in the print data received from the PC 102 and the paper information 104 indicates that printing can be performed, using the printability information 108. In this case, since "glossy paper" indicated by the print setting information included in the print data does not match "plain paper" indicated by the paper information set for the cassette, the printer 101 determines that printing cannot be performed, and performs a warning display (error display). At this time, the printer 101 displays "glossy paper" as the error display on the display unit 109 of the printer 101. As a result, a media type (i.e., glossy paper) different from "photo postcard" set by the user using the printer driver 114 is displayed, and therefore print setting information different from the print setting information set by the user himself/herself is displayed.

Figure 24:
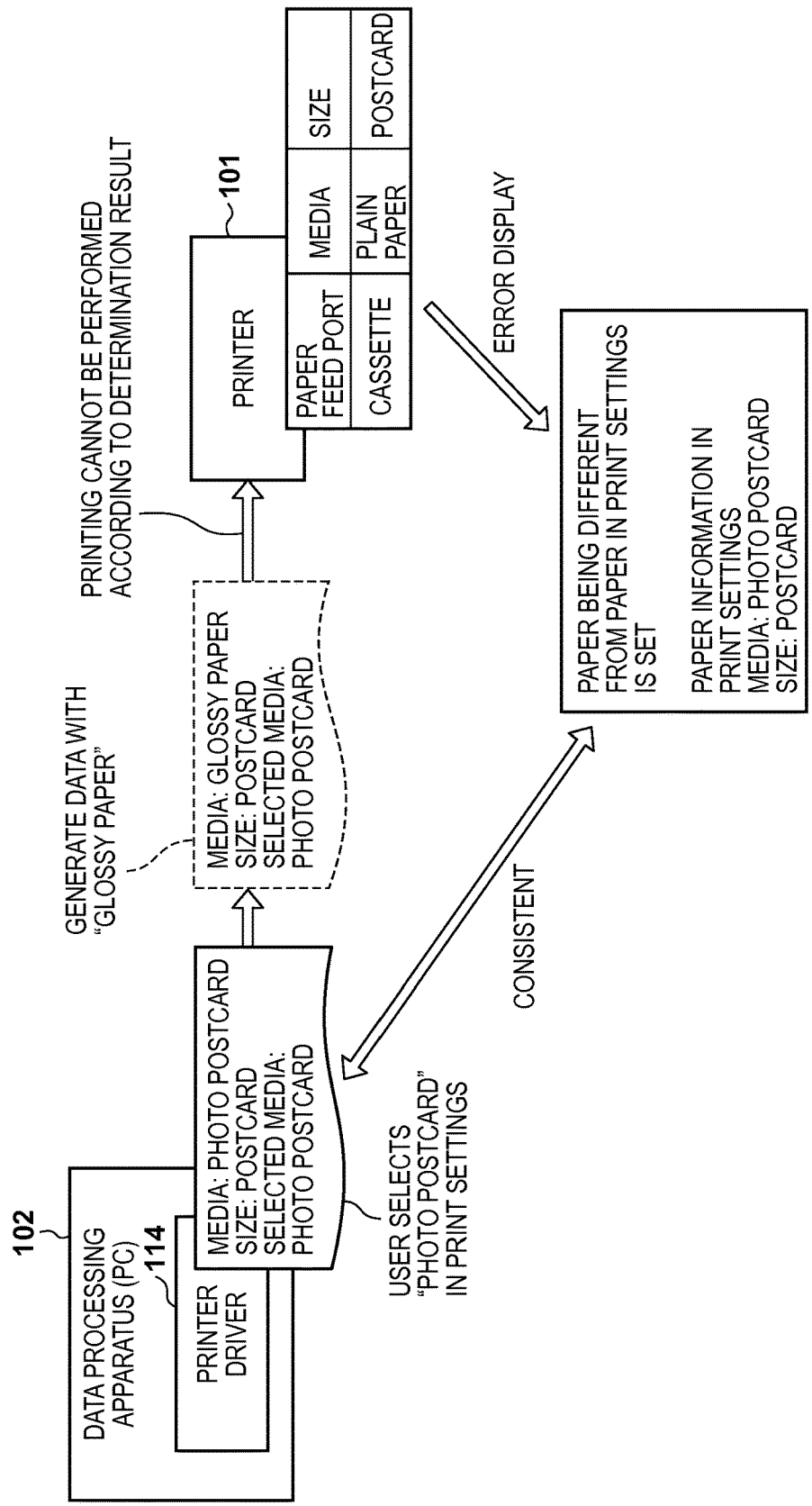
FIG. 24 is a diagram showing a specific example of Embodiment 6.

Exemplary processing to be used as a method for solving this problem will now be described using FIG. 24.

Assume that the user sets, on the printer driver 114, "photo postcard" as the media type and "postcard" as the size in the print setting information, and executes the printing. The print setting change unit 120 of the printer driver 114 changes the media from "photo postcard" to "glossy paper" to generate the print data, and transmits the print data to the printer 101. Here, information of the media selected by the user is included, as selected media information, in the print setting information in the print data. That is to say, the printer driver 114 generates the print data including "photo postcard", which is the media selected by the user, as the print setting information, and transmits the print data to the printer 101.

The printer 101 determines whether or not the combination of the print setting information in the print data received from the PC 102 and the paper information 104 indicates that printing can be performed, using the printability information 108. In this case, regarding the media, "glossy paper" indicated by the print setting information does not match "plain paper" indicated by the paper information, and therefore the printer 101 determines that printing cannot be performed, and performs a warning display (error display). At this time, the printer 101 does not display the media information (glossy paper) in the print setting information but displays the selected media information (photo postcard) as the paper information to be subjected to the error display. The warning display that matches the print setting information set by the user can thereby be performed.

Note that the functions in the above embodiments can also be achieved by the following configurations. That is to say, the functions are also achieved by a program code for performing the processing in the embodiments being supplied to a system or an apparatus, and a computer (or a CPU or an MPU) in this system or apparatus executing the program code. In this case, the program code itself that is read out from a storage medium will achieve the functions in the above embodiments, and the storage medium that stores this program code will also achieve the functions in the embodiments.

The program code for achieving the functions in the embodiments may be executed by a single computer (CPU, MPU), or may be executed by a plurality of computers operating together. Furthermore, the program code may be executed by a computer, or hardware such as a circuit for achieving the functions of the program code may be provided. Alternatively, a part of the program code may be achieved by hardware, and the remaining part may be executed by a computer.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-138021, filed Jul. 3, 2014 and 2015-104914, filed May 22, 2015, which are hereby incorporated by reference herein in their entirety.

What is claimed is:

1. A print control system that controls a printing apparatus having a paper feed unit, the system comprising:
one or more processors operating:
to determine whether printing using print data can be performed, based on first paper information included in a print setting in the print data, second paper information that is set in the printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper; and
to control the printing using the print data, based on a result of the determination,
wherein (i) it is determined that the printing using the print data can be performed in a case in which the first paper information included in the print setting and the second paper information set in the printing apparatus are matched, (ii) it is determined that the printing using the print data can be performed in a case in which a combination of the first paper information included in the print setting and the second paper information set in the printing apparatus is the printable combination indicated by the printability information, even if the first paper information included in the printing setting and the second paper information set in the printing apparatus are not matched, and (iii) it is determined that the printing using the print data cannot be performed in a case in which the first paper information included in the print setting and the second paper information set in the printing apparatus are not matched and a combination of the first paper information included in the print setting and the second paper information set in the printing apparatus is not the printable combination indicated by the printability information,
wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and
wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

2. The print control system according to claim 1, wherein the first paper information included in the print setting is at least one of first print setting information that is set using a setting screen of a printer driver, and second print setting information that has been changed from the first print setting information based on a predetermined condition.

3. The print control system according to claim 1, further comprising a display portion configured to display, if it is determined that the printing using the print data cannot be performed, information indicating that the printing using the print data cannot be performed, and the first paper information included in the print setting.

4. The print control system according to claim 1, wherein the determination is made in one of (i) an information processing apparatus that generates the print data, and (ii) in the printing apparatus.

5. A print control apparatus that outputs print data to a printing apparatus having a paper feed unit, the print control apparatus comprising:
one or more processors operating:
to set first print setting information with respect to the print data that is output to the printing apparatus;
to change the first print setting information into second print setting information based on a predetermined condition;
to transmit the print data to the printing apparatus; and
to control printing using the print data, based on (a) first paper information included in a print setting for print data to be transmitted to the printing apparatus, second paper information that is set in the printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper, and (b) a result of a determination of whether the print data is printable,
wherein (i) the print data is printable in a case in which the first paper information included in the print setting and the second paper information set in the printing apparatus are matched, (ii) the print data is printable in a case in which a combination of the first paper information included in the print setting and the second paper information set in the printing apparatus is the printable combination indicated by the printability information, even if the first paper information included in the printing setting and the second paper information set in the printing apparatus are not matched, and (iii) the print data is not printable in a case in which the first paper information included in the print setting and the second paper information set in the printing apparatus are not matched and a combination of the first paper information included in the print setting and the second paper information set in the printing apparatus is not the printable combination indicated by the printability information,
wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and
wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

6. The print control apparatus according to claim 5, wherein the one or more processors further operate to determine whether the print data is printable, based on the first paper information included in the print setting for the print data, the second paper information that is set in the printing apparatus, and the printability information indicating the printable combination of the first paper information included in the print setting and the second paper information set in the printing apparatus.

7. A print control apparatus that controls a printing apparatus having a paper feed unit, the apparatus comprising:
one or more processors operating:
to receive print data;
to determine whether the print data is printable, based on first paper information included in a print setting for the print data, second paper information that is set in the printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper; and
to control printing using the print data, based on a result of the determination,
wherein (i) the print data is printable in a case in which the first paper information included in the print setting and the second paper information set in the printing apparatus are matched, (ii) the print data is printable in a case in which a combination of the first paper information included in the print setting and the second paper information set in the printing apparatus is the printable combination indicated by the printability information, even if the first paper information included in the print setting and the second paper information set in the printing apparatus are not matched, and (iii) the print data is not printable in a case in which the first paper information included in the print setting and the second paper information set in the printing apparatus are not matched and a combination of the first paper information included in the print setting and the second paper information set in the printing apparatus is not the printable combination indicated by the printability information,
wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

8. The print control apparatus according to claim 5, further comprising a display portion configured to display, if a result of the determination is that printing using the print data cannot be performed, information indicating that the printing using the print data cannot be performed, and the first paper information included in the print setting in the print data.

9. The print control apparatus according to claim 5, wherein the first paper information included in the print setting is at least one of the first print setting information that is set before the print data is generated, and the second print setting information that has been changed from the first print setting information based on a predetermined condition.

10. The print control apparatus according to claim 5, wherein, if there is change information that relates to the print data and indicates that the first print setting information has been changed into the second print setting information, the determination of whether the print data is printable is executed further using the change information.

11. The print control apparatus according to claim 10, further comprising a display portion configured to display, if a result of the determination is that printing using the print data cannot be performed, information indicating that the printing using the print data cannot be performed, and the first paper information included in the print setting in the print data.

12. The print control apparatus according to claim 11, wherein the change information and the first print setting information are output as data that is separate from the print data, to the printing apparatus.

13. A print control method for controlling a printing apparatus having a paper feed unit, the method comprising:
  determining whether printing using print data can be performed, based on first paper information included in a print setting in the print data, second paper information that is set in the printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper; and
  controlling the printing using the print data, based on a result of the determination,
  wherein it is determined that the printing using the print data can be performed in a case in which the first paper information included in the print setting and the second paper information set in the printing apparatus are matched,
  wherein it is determined that the printing using the print data can be performed in a case in which a combination of the first paper information included in the print setting and the second paper information set in the printing apparatus is the printable combination indicated by the printability information, even if the first paper information included in the print setting and the second paper information set in the printing apparatus are not matched,
  wherein it is determined that the printing using the print data cannot be performed in a case in which the first paper information included in the print setting and the second paper information set in the printing apparatus are not matched and a combination of the first paper information included in the print setting and the second paper information set in the printing apparatus is not the printable combination indicated by the printability information,
  wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and
  wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

14. A non-transitory computer-readable storage medium storing a program for causing a computer:
  to set first print setting information with respect to print data that is output to a printing apparatus;
  to change the first print setting information into second print setting information based on a predetermined condition;
  to transmit the print data to the printing apparatus; and
  to control printing using the print data, based on (a) first paper information included in a print setting for print data to be transmitted to the printing apparatus, second paper information that is set in the printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper, and (b) a result of a determination of whether the print data is printable,
  wherein (i) the print data is printable in a case in which the first paper information included in the print setting and the second paper information set in the printing apparatus are matched, (ii) the print data is printable in a case in which a combination of the first paper information included in the print setting and the second paper information set in the printing apparatus is the printable combination indicated by the printability information, even if the first paper information included in the print setting and the second paper information set in the printing apparatus are not matched, and (iii) the print data is not printable in a case in which the first paper information included in the print setting and the second paper information set in the printing apparatus are not matched and a combination of the first paper information included in the print setting and the second paper information set in the printing apparatus is not the printable combination indicated by the printability information, wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

15. A non-transitory computer-readable storage medium storing a program for causing a computer:

to receive print data;

to determine whether the print data is printable, based on first paper information included in a print setting for the print data, second paper information that is set in a printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper; and to control printing using the print data, based on a result of the determination, wherein (i) the print data is printable in a case in which the first paper information included in the print setting and the second paper information set in the printing apparatus are matched, (ii) the print data is printable in a case in which a combination of the first paper information included in the print setting and the second paper information set in the printing apparatus is the printable combination indicated by the printability information, even if the first paper information included in the print setting and the second paper information set in the printing apparatus are not matched, and (iii) the print data is not printable in a case in which the first paper information included in the print setting and the second paper information set in the printing apparatus are not matched and a combination of the first paper information included in the print setting and the second paper information set in the printing apparatus is not the printable combination indicated by the printability information, wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

16. A non-transitory computer-readable storage medium storing a program for causing a computer to execute a print control method, the print control method comprising:

determining whether printing using print data can be performed, based on first paper information included in a print setting in the print data, second paper information that is set in the printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper; and controlling the printing using the print data, based on a result of the determination, wherein it is determined that the printing using the print data can be performed in a case in which the first paper information included in the print setting and the second paper information set in the printing apparatus are matched, wherein it is determined that the printing using the print data can be performed in a case in which a combination of the first paper information included in the print setting and the second paper information set in the printing apparatus is the printable combination indicated by the printability information, even if the first paper information included in the print setting and the second paper information set in the printing apparatus are not matched, wherein it is determined that the printing using the print data cannot be performed in a case in which the first paper information included in the print setting and the second paper information set in the printing apparatus are not matched and a combination of the first paper information included in the print setting and the second paper information set in the printing apparatus is not the printable combination indicated by the printability information, wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

17. The print control system according to claim 1, wherein the printability information is stored in the printing apparatus.

18. The print control system according to claim 1, wherein it is determined whether the combination of the first paper information included in the print setting and the second paper information set in the printing apparatus is the printable combination indicated by the printability information in a case in which the first paper information included in the print setting does not match the second paper information set in the printing apparatus, and it is determined that the printing using the print data can be performed in a case in which the combination of the first paper information included in the print setting and the second paper information set in the printing apparatus is the printable combination.

19. A print control method for controlling a printing apparatus having a paper feed unit, the method comprising:
receiving print data;
determining whether the print data is printable, based on first paper information included in a print setting for the print data, second paper information that is set in the printing apparatus, and printability information indicating a printable combination of the first paper information included in the print setting and the second paper information set in the printing apparatus, wherein the first paper information included in the print setting and the second paper information set in the printing apparatus each includes both of (i) information regarding a type of paper and (ii) information regarding a size of paper; and controlling the printing using the print data, based on a result of the determination, wherein it is determined that the print data is printable in a case in which the first paper information included in the print setting and the second paper information set in the printing apparatus are matched, wherein it is determined that the print data is printable in a case in which a combination of the first paper information included in the print setting and the second paper information set in the printing apparatus is the printable combination indicated by the printability information, even if the first paper information included in the print setting and the second paper information set in the printing apparatus are not matched, wherein it is determined that the print data is not printable in a case in which the first paper information included in the print setting and the second paper information set in the printing apparatus are not matched and a combination of the first paper information included in the print setting and the second paper information set in the printing apparatus is not the printable combination indicated by the printability information, wherein the printability information indicates that the combination of the first paper information and the second paper information is the printable combination, in a case in which the information regarding a type of paper included in the first paper information and the information regarding a type of paper included in the second paper information satisfy a specific condition, even if the information regarding a size of paper included in the first paper information and the information regarding a size of paper included in the second paper information are not matched, and wherein the printability information indicates that the combination of the first paper information and the second paper information is the printable combination, in a case in which the information regarding a size of paper included in the first paper information and the information regarding a size of paper included in the second paper information satisfy a specific condition, even if the information regarding a type of paper included in the first paper information and the information regarding a type of paper included in the second paper information are not matched.

* * * * *